(12) United States Patent
Mao et al.

(10) Patent No.: US 6,989,214 B2
(45) Date of Patent: Jan. 24, 2006

(54) UNITIZED FUEL CELL ASSEMBLY

(75) Inventors: Shane S. Mao, Woodbury, MN (US); Daniel M. Pierpont, North Saint Paul, MN (US); Jimmy M. Le, Saint Paul, MN (US); Kim B. Saulsbury, Lake Elmo, MN (US); John R. Mlinar, Coon Rapids, MN (US); Claude D. Moreau, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 339 days.

(21) Appl. No.: 10/295,292

(22) Filed: Nov. 15, 2002

(65) Prior Publication Data

US 2004/0096725 A1 May 20, 2004

(51) Int. Cl.
  H01M 2/08 (2006.01)
  H01M 8/10 (2006.01)
  H01M 2/14 (2006.01)
  H01M 4/86 (2006.01)

(52) U.S. Cl. ............................. 429/35; 429/32; 429/36; 429/38; 429/40

(58) Field of Classification Search ............... 429/30, 429/32, 35, 36, 38, 40
See application file for complete search history.

(56) References Cited

U.S. PATENT DOCUMENTS 6,020,083 A * 2/2000 Breault et al. ............... 429/36
6,159,628 A    12/2000 Grasso et al. ............... 429/35
6,399,234 B2 * 6/2002 Bonk et al. .................. 429/32
2002/0081474 A1  6/2002 Foster ........................ 429/30
2002/0110720 A1  8/2002 Yang .......................... 429/35

FOREIGN PATENT DOCUMENTS

| EP | 0 933 826 | 8/1999 |
| EP | 1 156 546 | 11/2001 |
| EP | 1 220 345 | 7/2002 |
| EP | 1 223 629 | 7/2002 |
| EP | 1 372 203 | 12/2003 |
| EP | 1 391 956 | 2/2004 |
| WO | WO 00/10216 | 2/2000 |
| WO | WO 02/27847 | 4/2002 |
| WO | WO 02/056407 | 7/2002 |
| WO | WO 02/065572 A2 | 8/2002 |
| WO | WO 02/089240 | 11/2002 |
| WO | WO 03/026049 A2 | 3/2003 |
| WO | WO 03/041205 | 5/2003 |

* cited by examiner

Primary Examiner—Patrick Joseph Ryan
Assistant Examiner—Thomas H. Parsons
(74) Attorney, Agent, or Firm—Philip Y. Dahl

(57) ABSTRACT

A unitized fuel cell assembly includes a first flow field plate, a second flow field plate, and a membrane electrode assembly (MEA) provided between the first and second flow field plates. A hard stop arrangement, in one configuration, is provided between the first and second flow field plates. The hard stop arrangement is dimensioned to limit compressive forces imparted to the MEA upon establishment of contact between the first and second flow field plates under pressure. A sealing arrangement is provided between the first and second flow field plates and peripheral to the MEA. The unitized fuel cell assembly is configured as a stand-alone fuel cell unit that can be used alone or in a stack of fuel cell units.

66 Claims, 18 Drawing Sheets

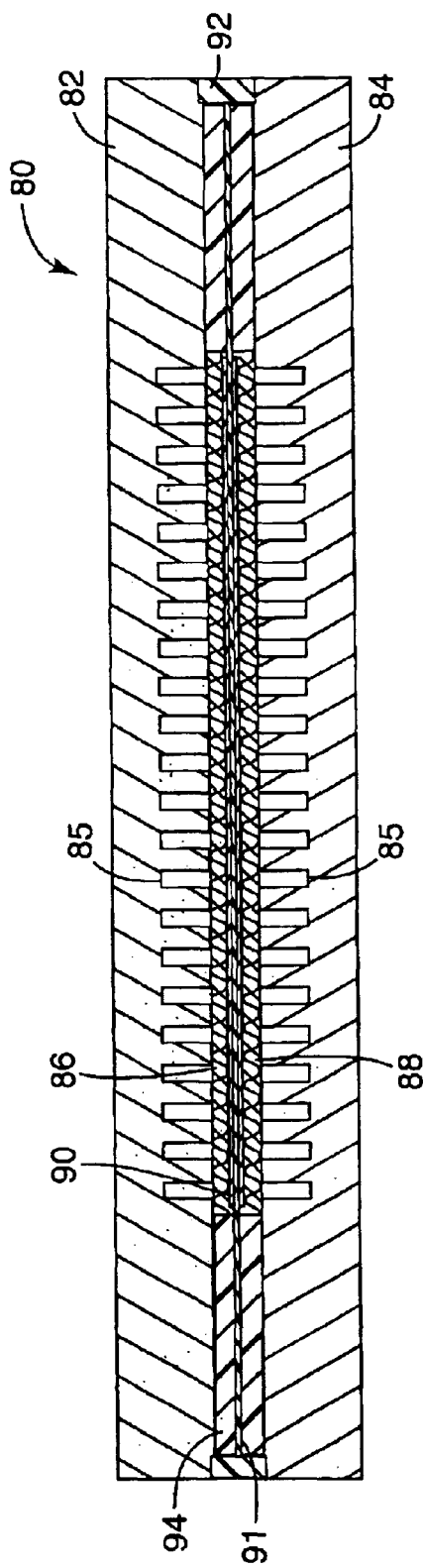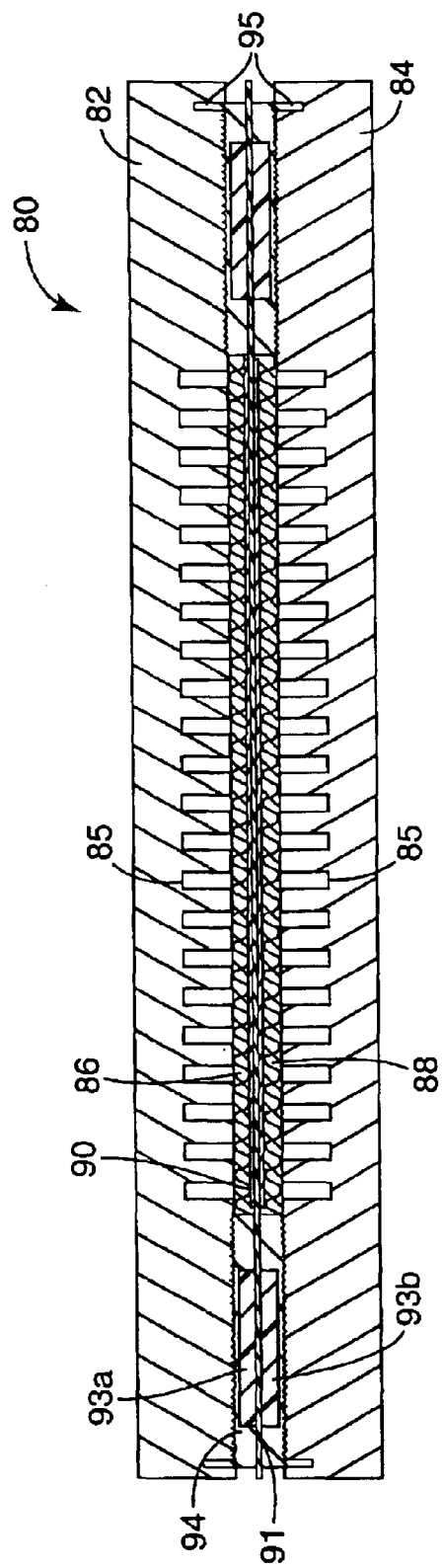

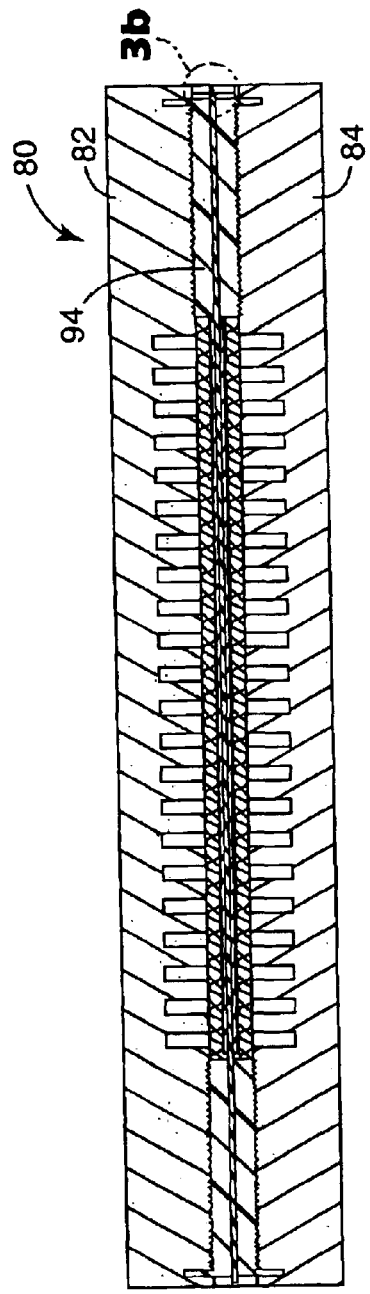
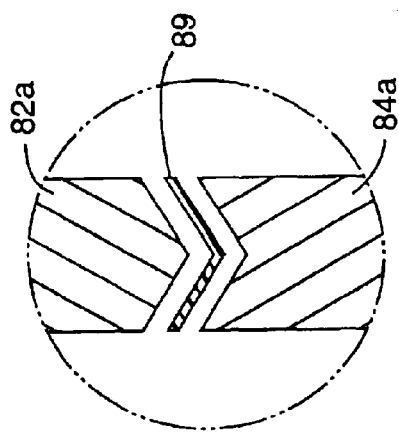
FIG. 3a
FIG. 3b

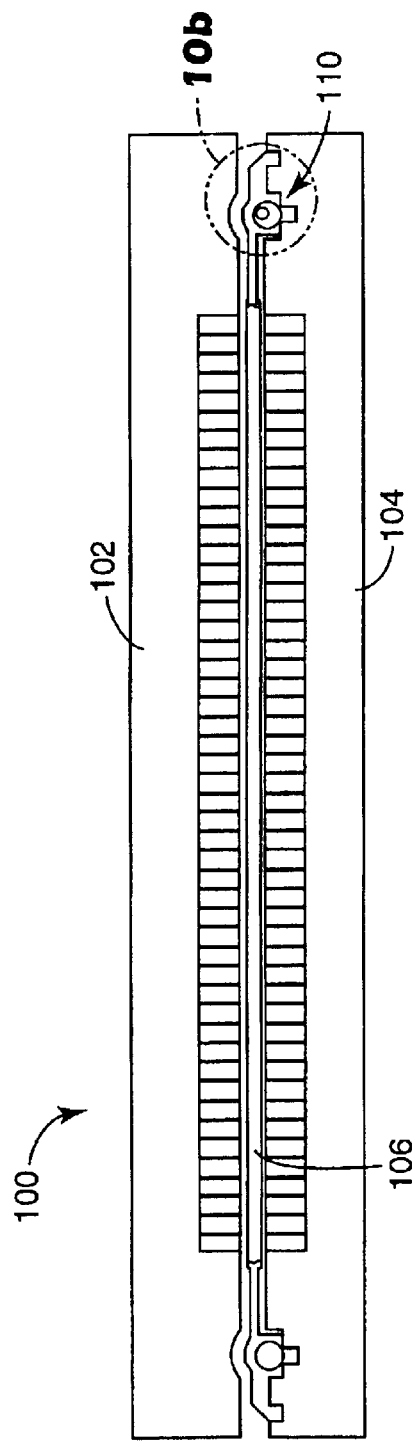
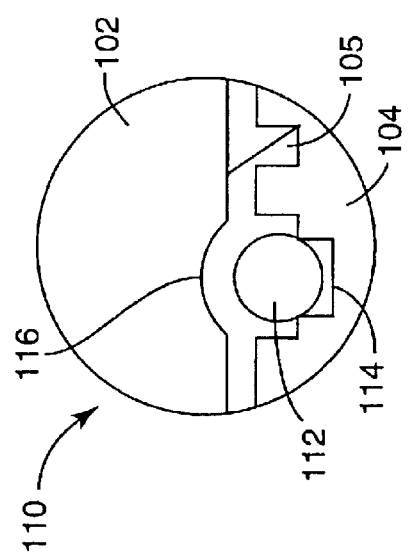
FIG. 4a
FIG. 4b

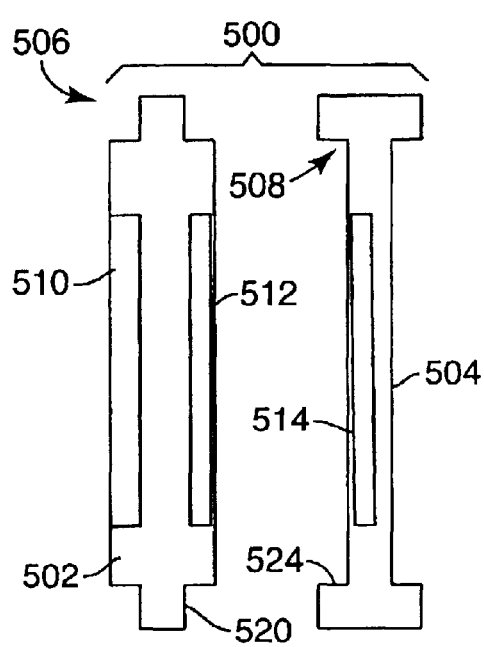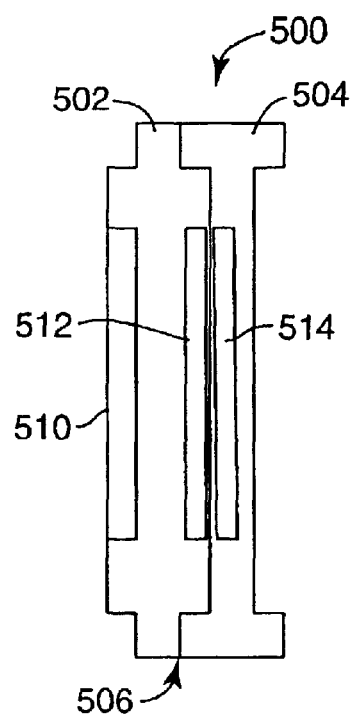
FIG. 8a
FIG. 8b
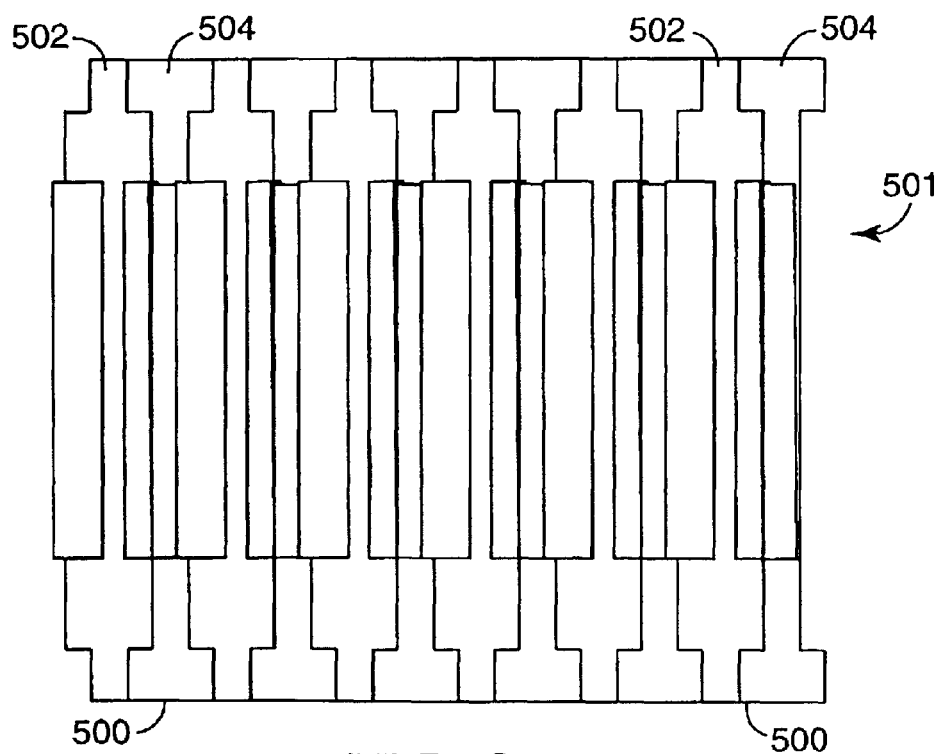
FIG. 8c

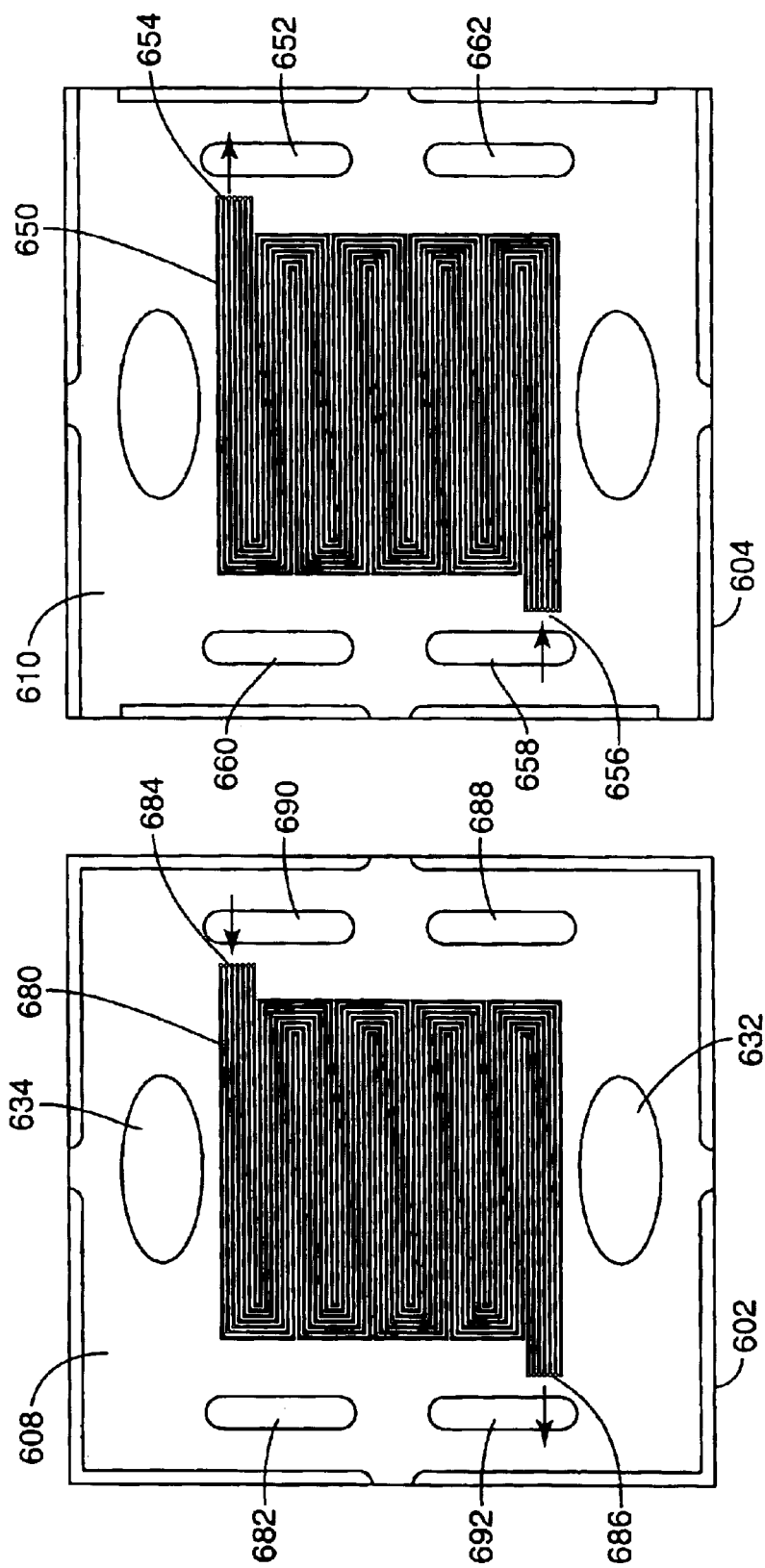

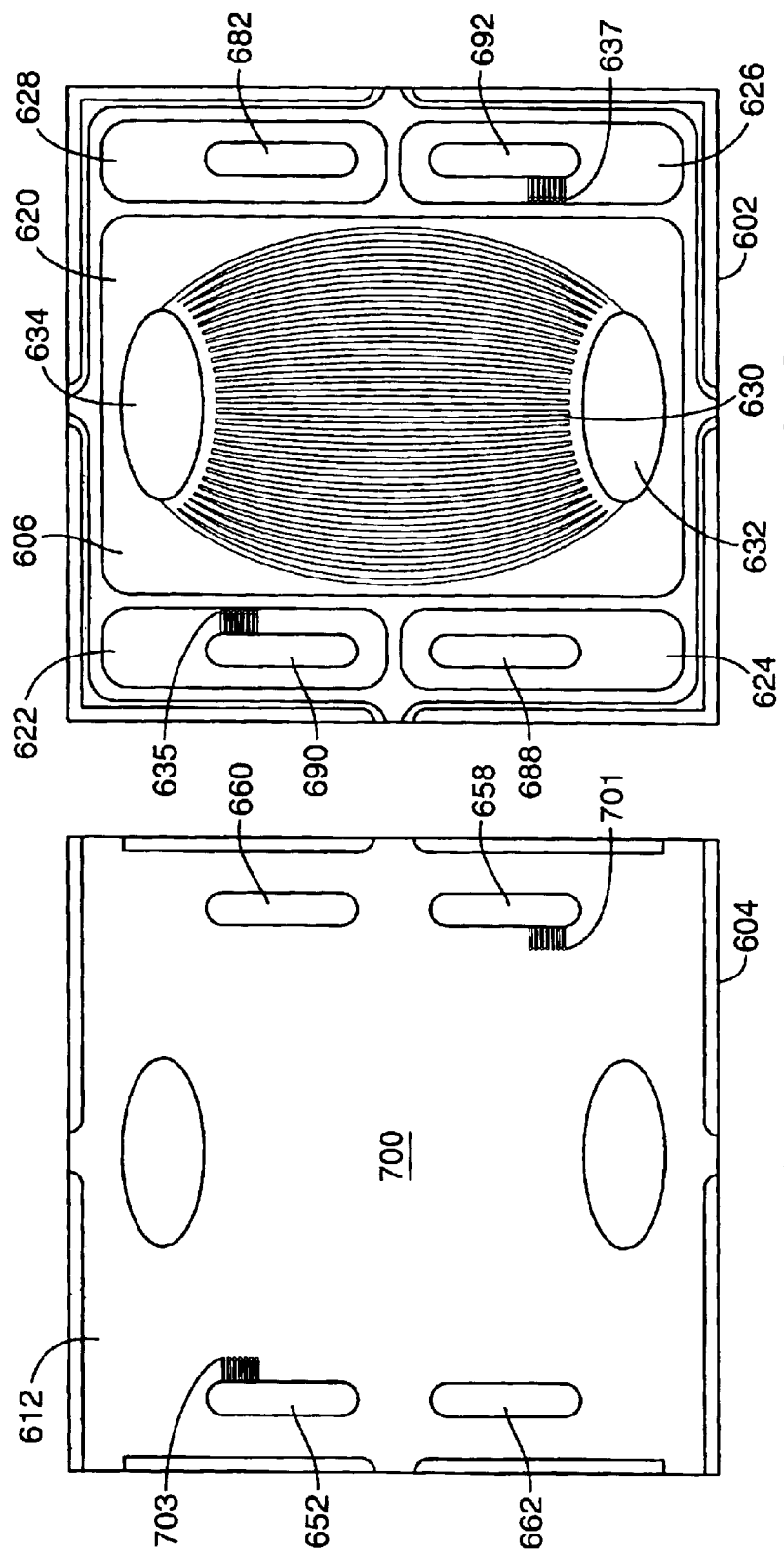

UNITIZED FUEL CELL ASSEMBLY

FIELD OF THE INVENTION

The present invention relates generally to fuel cells and, more particularly, to a unitized fuel cell assembly and packaging methodology.

BACKGROUND OF THE INVENTION

A typical fuel cell power system includes a power section in which one or more stacks of fuel cells are provided. The efficacy of the fuel cell power system depends in large part on the integrity of the various contacting and sealing interfaces within individual fuel cells and between adjacent fuel cells of the stack.

Presently, the process of building a stack of fuel cells using conventional approaches is tedious, time-consuming, and not readily adaptable for mass production. By way of example, a typical 5 k kW fuel cell stack can include some 80 membrane electrode assemblies (MEAs), some 160 flow field plates, and some 160 sealing gaskets. These and other components of the stack must be carefully aligned and assembled. Misalignment of even a few components can lead to gas leakage, hydrogen crossover, and performance/durability deterioration.

Moreover, fuel cell MEAs are very fragile and need to be handled very carefully to prevent electrical shorting, pinholes, and wrinkles formed on the membrane, for example. MEA contamination is another significant concern during fuel cell stack assembly. Presently known stack assembling processes are so labor intensive that cost effective manufacturing of fuel cell systems may not be achievable using conventional approaches.

There is a need for an improved fuel cell assembly and packaging methodology. There is a further need for a fuel cell assembly that facilitates efficient assembling and disassembling of fuel cell stacks. There is a further need for recycling useful components in fuel cell stacks and systems. The present invention fulfills these and other needs.

SUMMARY OF THE INVENTION

The present invention is directed to a unitized fuel cell assembly (UCA) and packaging methodology. A unitized fuel cell system is unitary module or unit that comprises one or more cells that can work as a functioning fuel cell alone or in conjunction with other UCA's in a stack. According to an embodiment of the present invention, a UCA includes a first flow field plate and a second flow field plate. A membrane electrode assembly (MEA) is provided between the first and second flow field plates. The MEA includes first and second fluid transport layers (FTLs) and a membrane provided between anode and cathode catalytic layers. A hard stop arrangement is provided between the first and second flow field plates. A thermoplastic material is provided between at least a portion of the first and second FTLs and within a gap defined between the first and second FTLs and the hard stop arrangement.

According to another embodiment, a UCA includes a first flow field plate, a second flow field plate, and an MEA provided between the first and second flow field plates. A hard stop arrangement is provided between the first and second flow field plates. The hard stop arrangement is dimensioned to control compressive forces imparted to the MEA upon establishment of contact between the first and second flow field plates under pressure. A sealing arrangement is provided between the first and second flow field plates and peripheral to the MEA.

In accordance with a further embodiment, a unitized fuel cell assembly is configured for recyclable use. A recyclable unitary fuel cell assembly according to this embodiment includes a first flow field plate, a second flow field plate, and an MEA provided between the first and second flow field plates. A sealing arrangement is provided between the first and second flow field plates. The assembly further includes an engagement arrangement that releasably couples together the first and second flow field plates. The engagement arrangement is configured to permit repeated coupling and decoupling of the first and second flow field plates, whereby at least the first and second flow field plates are recoverable for reuse with a replacement component of the unitary fuel cell assembly.

In yet another embodiment of the present invention, a unitary fuel cell assembly includes a first flow field plate, a second flow field plate, and an MEA provided between the first and second flow field plates. The MEA includes first and second fluid transport layers (FTLs) and a membrane provided between anode and cathode catalytic layers. A thermoplastic material is provided between at least a portion of the first and second FTLs, and further between the first and second flow field plates for bonding together the first and second flow field plates to define a unitary structure.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 2a is a sectional view of a unitized cell assembly employing an external hard stop arrangement and an in-situ formed sealing gasket in accordance with an embodiment of the present invention;

FIG. 2b is a sectional view of a unitized cell assembly employing an internal hard stop arrangement and an in-situ formed sealing gasket in accordance with an embodiment of the present invention;

FIGS. 3a and 3b are sectional views of a unitized cell assembly employing a built-in hard stop arrangement and an in-situ formed sealing gasket in accordance with an embodiment of the present invention;

FIGS. 4a and 4b are schematic sectional views of a unitized cell assembly employing an internal hard stop arrangement and an in-situ formed sealing gasket in accordance with another embodiment of the present invention;

FIGS. 8a–8c illustrate various sectional views of a unitized cell assembly which employs a locking or engagement capability in accordance an embodiment of the present invention;

FIGS. 9a–9e illustrate various views of a unitized cell assembly which incorporates an integral cooling arrangement in accordance with an embodiment of the present invention;

Figure 1A:
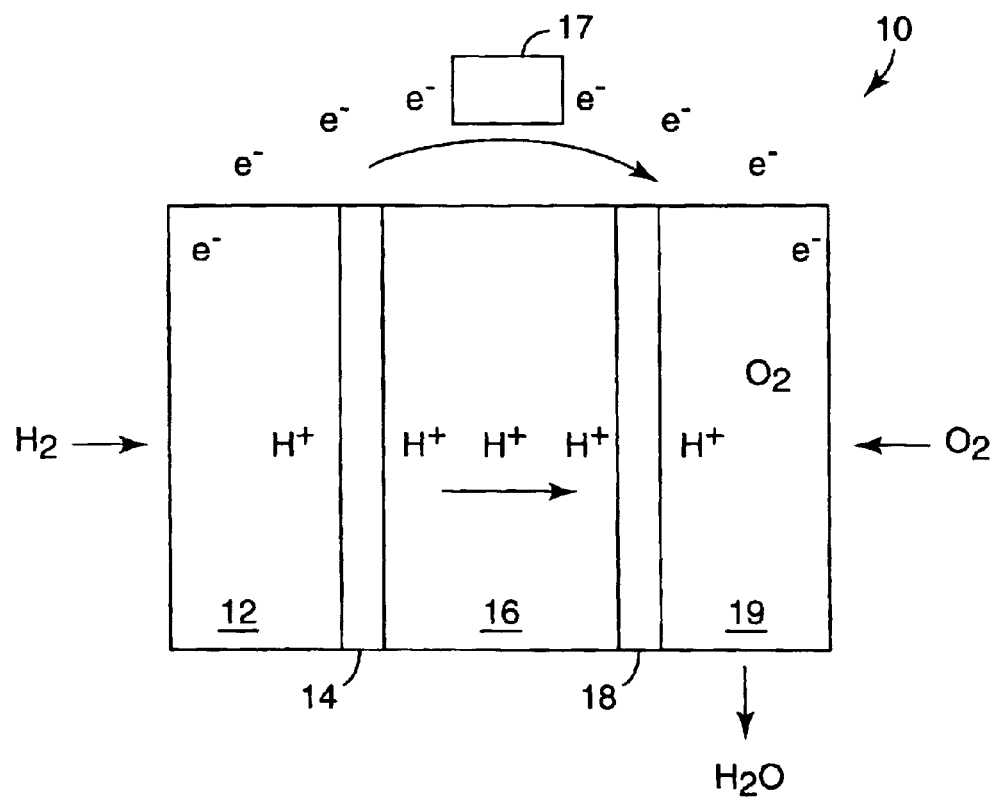
FIG. 1a is an illustration of a fuel cell and its constituent layers.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is directed to an improved fuel cell assembly. Various embodiments of the present invention are directed to a unitized fuel cell assembly which provides for ease of fuel cell assembling and disassembling. A unitized fuel cell package implemented in accordance with the present invention can further provide for recycling of fuel cells configured for arrangement in a stack during fabrication, repair, and maintenance of individual fuel cells and the fuel cell stack.

Certain embodiments are directed to a unitized fuel cell assembly implemented in a monopolar or bipolar configuration. In other embodiments, a unitized fuel cell is provided with a thermal management arrangement. In such embodiments, the thermal management arrangement can be implemented integral to a unitized fuel cell assembly or as a structure separate from the unitized fuel cell assembly. Further embodiments of the present invention are directed to fuel cell stacks and systems implemented using unitized fuel cell assemblies.

A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

A typical fuel cell is depicted in FIG. 1a. The fuel cell 10 shown in FIG. 1 includes a first fluid transport layer (FTL) 12 adjacent an anode 14. Adjacent the anode 14 is an electrolyte membrane 16. A cathode 18 is situated adjacent the electrolyte membrane 16, and a second fluid transport layer 19 is situated adjacent the cathode 18. In operation, hydrogen fuel is introduced into the anode portion of the fuel cell 10, passing through the first fluid transport layer 12 and over the anode 14. At the anode 14, the hydrogen fuel is separated into hydrogen ions (H) and electrons (e).

The electrolyte membrane 16 permits only the hydrogen ions or protons to pass through the electrolyte membrane 16 to the cathode portion of the fuel cell 10. The electrons cannot pass through the electrolyte membrane 16 and, instead, flow through an external electrical circuit in the form of electric current. This current can power an electric load 17, such as an electric motor, or be directed to an energy storage device, such as a rechargeable battery.

Oxygen flows into the cathode side of the fuel cell 10 via the second fluid transport layer 19. As the oxygen passes over the cathode 18, oxygen, protons, and electrons combine to produce water and heat.

Individual fuel cells, such as that shown in FIG. 1a, can be packaged as unitized fuel cell assemblies as will be described in detail hereinbelow. The unitized fuel cell assemblies, referred to herein as unitized cell assemblies or UCAs for convenience, can be combined with a number of other UCAs to form a fuel cell stack. The number of UCAs within the stack determines the total voltage of the stack, and the active surface area of each of the cells determines the total current. The total electrical power generated by a given fuel cell stack can be determined by multiplying the total stack voltage by total current.

A number of different fuel cell technologies can be employed to construct UCAs in accordance with the principles of the present invention. For example, a UCA packaging methodology of the present invention can be employed to construct proton exchange membrane (PEM) fuel cell assemblies. PEM fuel cells operate at relatively low temperatures (about 175° F./80° C.), have high power density, can vary their output quickly to meet shifts in power demand, and are well suited for applications where quick startup is required, such as in automobiles for example.

The proton exchange membrane used in a PEM fuel cell is typically a thin plastic sheet that allows hydrogen ions to pass through it. The membrane is typically coated on both sides with highly dispersed metal or metal alloy particles (e.g., platinum or platinum/ruthenium) that are active catalysts. The electrolyte used is typically a solid organic polymer such as poly-perfluorosulfonic acid. Use of a solid electrolyte is advantageous because it reduces corrosion and management problems.

Hydrogen is fed to the anode side of the fuel cell where the catalyst promotes the hydrogen atoms to release electrons and become hydrogen ions (protons). The electrons travel in the form of an electric current that can be utilized before it returns to the cathode side of the fuel cell where oxygen has been introduced. At the same time, the protons diffuse through the membrane to the cathode, where the hydrogen ions are recombined and reacted with oxygen to produce water.

A membrane electrode assembly (MEA) is the central element of PEM fuel cells, such as hydrogen fuel cells. As discussed above, typical MEAs comprise a polymer electrolyte membrane (PEM) (also known as an ion conductive membrane (ICM)), which functions as a solid electrolyte.

One face of the PEM is in contact with an anode electrode layer and the opposite face is in contact with a cathode electrode layer. Each electrode layer includes electrochemical catalysts, typically including platinum metal. Fluid transport layers (FTLs) facilitate gas transport to and from the anode and cathode electrode materials and conduct electrical current.

In a typical PEM fuel cell, protons are formed at the anode via hydrogen oxidation and transported to the cathode to react with oxygen, allowing electrical current to flow in an external circuit connecting the electrodes. The FTL may also be called a gas diffusion layer (GDL) or a diffuser/current collector (DCC). The anode and cathode electrode layers may be applied to the PEM or to the FTL during manufacture, so long as they are disposed between PEM and FTL in the completed MEA.

Any suitable PEM may be used in the practice of the present invention. The PEM typically has a thickness of less than 50 μm, more typically less than 40 μm, more typically less than 30 μm, and most typically about 25 μm. The PEM is typically comprised of a polymer electrolyte that is an acid-functional fluoropolymer, such as Nafion® (DuPont Chemicals, Wilmington DE) and Flemion® (Asahi Glass Co. Ltd., Tokyo, Japan). The polymer electrolytes useful in the present invention are typically preferably copolymers of tetrafluoroethylene and one or more fluorinated, acid-functional comonomers.

Typically, the polymer electrolyte bears sulfonate functional groups. Most typically, the polymer electrolyte is Nafion®. The polymer electrolyte typically has an acid equivalent weight of 1200 or less, more typically 1100 or less, more typically 1050 or less, and most typically about 1000.

Any suitable FTL may be used in the practice of the present invention. Typically, the FTL is comprised of sheet material comprising carbon fibers. The FTL is typically a carbon fiber construction selected from woven and non-woven carbon fiber constructions. Carbon fiber constructions which may be useful in the practice of the present invention may include: Toray Carbon Paper, SpectraCarb Carbon Paper, AFN non-woven carbon cloth, Zoltek Carbon Cloth, and the like. The FTL may be coated or impregnated with various materials, including carbon particle coatings, hydrophilizing treatments, and hydrophobizing treatments such as coating with polytetrafluoroethylene (PTFE).

Any suitable catalyst may be used in the practice of the present invention. Typically, carbon-supported catalyst particles are used. Typical carbon-supported catalyst particles are 50–90% carbon and 10–50% catalyst metal by weight, the catalyst metal typically comprising Pt for the cathode and Pt and Ru in a weight ratio of 2:1 for the anode. The catalyst is typically applied to the PEM or to the FTL in the form of a catalyst ink. The catalyst ink typically comprises polymer electrolyte material, which may or may not be the same polymer electrolyte material which comprises the PEM.

The catalyst ink typically comprises a dispersion of catalyst particles in a dispersion of the polymer electrolyte. The ink typically contains 5–30% solids (i.e. polymer and catalyst) and more typically 10–20% solids. The electrolyte dispersion is typically an aqueous dispersion, which may additionally contain alcohols, polyalcohols, such a glycerin and ethylene glycol, or other solvents such as N-methylpyrilidon (NMP) and dimethylformaldehyde (DMF). The water, alcohol, and polyalcohol content may be adjusted to alter rheological properties of the ink. The ink typically contains 0–50% alcohol and 0–20% polyalcohol. In addition, the ink may contain 0–2% of a suitable dispersant. The ink is typically made by stirring with heat followed by dilution to a coatable consistency.

The catalyst may be applied to the PEM or the FTL by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Direct methanol fuel cells (DMFC) are similar to PEM cells in that they both use a polymer membrane as the electrolyte. In a DMFC, however, the anode catalyst itself draws the hydrogen from liquid methanol fuel, eliminating the need for a fuel reformer. DMFCs typically operate at a temperature between 120–190° F./49–88° C. A direct methanol fuel cell can be subject to UCA packaging in accordance with the principles of the present invention.

Figure 1B:
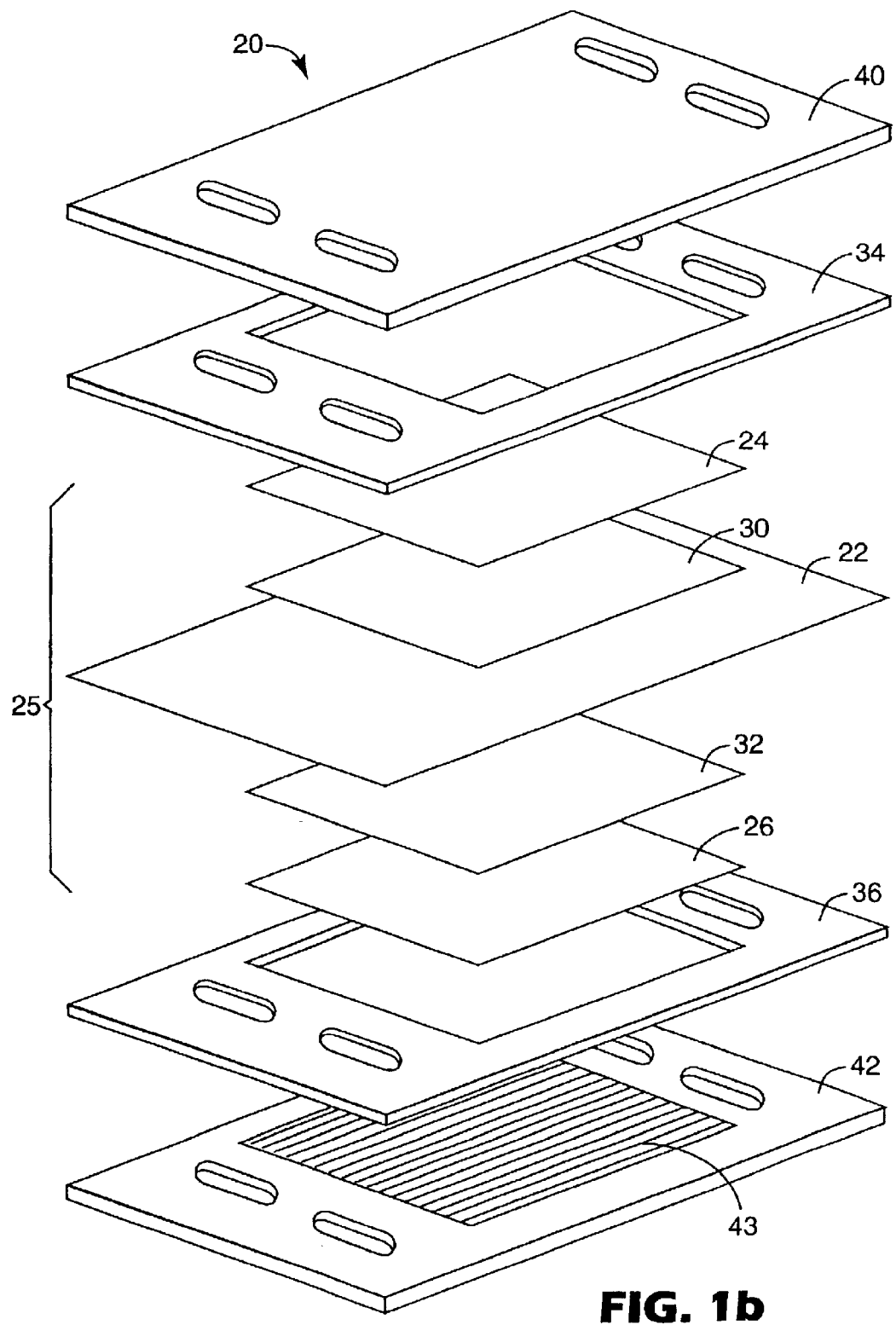
FIG. 1b illustrates a unitized cell assembly having a monopolar configuration in accordance with an embodiment of the present invention.

Referring now to FIG. 1b, there is illustrated an embodiment of a UCA implemented in accordance with a PEM fuel cell technology. As is shown in FIG. 1b, a membrane electrode assembly (MEA) 25 of the UCA 20 includes five component layers. A PEM layer 22 is sandwiched between a pair of fluid transport layers 24 and 26, such as diffuse current collectors (DCCs) or gas diffusion layers (GDLs) for example. An anode 30 is situated between a first FTL 24 and the membrane 22, and a cathode 32 is situated between the membrane 22 and a second FTL 26.

In one configuration, a PEM layer 22 is fabricated to include an anode catalyst coating 30 on one surface and a cathode catalyst coating 32 on the other surface. This structure is often referred to as a catalyst-coated membrane or CCM. According to another configuration, the first and second FTLs 24, 26 are fabricated to include an anode and cathode catalyst coating 30, 32, respectively. In yet another configuration, an anode catalyst coating 30 can be disposed partially on the first FTL 24 and partially on one surface of the PEM 22, and a cathode catalyst coating 32 can be disposed partially on the second FTL 26 and partially on the other surface of the PEM 22.

The FTLs 24, 26 are typically fabricated from a carbon fiber paper or non-woven material or woven cloth. Depending on the product construction, the FTLs 24, 26 can have carbon particle coatings on one side. The FTLs 24, 26, as discussed above, can be fabricated to include or exclude a catalyst coating.

In the particular embodiment shown in FIG. 1b, MEA 25 is shown sandwiched between a first edge seal system 34 and a second edge seal system 36. Adjacent the first and second edge seal systems 34 and 36 are flow field plates 40 and 42, respectively. Each of the flow field plates 40, 42 includes a field of gas flow channels 43 and ports through which hydrogen and oxygen feed fuels pass. In the configuration depicted in FIG. 1b, flow field plates 40, 42 are configured as monopolar flow field plates, in which a single MEA 25 is sandwiched there between. The flow field in this and other embodiments may be a low lateral flux flow field as disclosed in co-pending application Ser. No. 09/954,601, filed Sep. 17, 2001, and incorporated herein by reference.

The edge seal systems 34, 36 provide the necessary sealing within the UCA package to isolate the various fluid (gas/liquid) transport and reaction regions from contaminating one another and from inappropriately exiting the UCA 20, and may further provide for electrical isolation and hard stop compression control between the flow field plates 40, 42. The term "hard stop" as used herein generally refers to a nearly or substantially incompressible material that does not significantly change in thickness under operating pressures and temperatures. More particularly, the term "hard stop" refers to a substantially incompressible member or layer in an membrane electrode assembly (MEA) which halts compression of the MEA at a fixed thickness or strain. A "hard stop" as referred to herein is not intended to mean an ion conducting membrane layer, a catalyst layer, or a gas diffusion layer.

In one configuration, the edge seal systems 34, 36 include a gasket system formed from an elastomeric material. In other configurations, as will be described below, one, two or more layers of various selected materials can be employed to provide the requisite sealing within UCA 20. Other configurations employ an in-situ formed seal system.

In certain embodiments, the gasket may be a closed-cell foam rubber gasket as disclosed in co-pending application Ser. No. 10/294,098, filed Nov.14, 2002 incorporated herein by reference. In other embodiments, the gasket may be formed with a contact face having a raised-ridge microstructured sealing pattern as disclosed in co-pending application Ser. No. 10/143,273, filed May 10, 2002, and incorporated herein by reference.

Figure 1C:
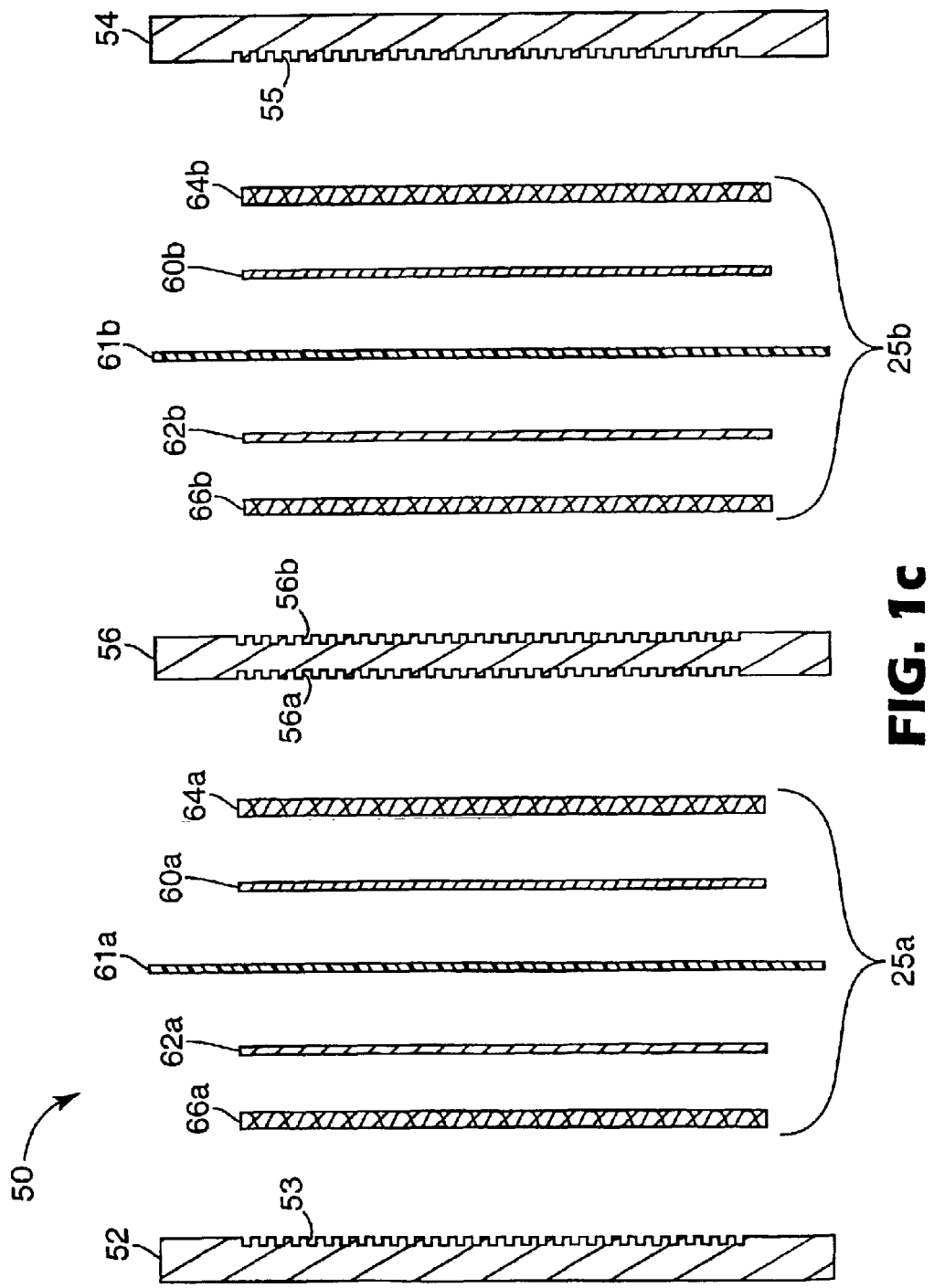
FIG. 1c illustrates a unitized cell assembly having a monopolar/bipolar configuration in accordance with an embodiment of the present invention.

FIG. 1c illustrates a UCA 50 which incorporates multiple MEAs 25 through employment of one or more bipolar flow field plates 56. In the configuration shown in FIG. 1c, UCA 50 incorporates two MEAs 25a and 25b and a single bipolar flow field plate 56. MEA 25a includes a cathode 62a/membrane 61a/anode 60a layered structure sandwiched between FTLs 66a and 64a. FTL 66a is situated adjacent a flow field end plate 52, which is configured as a monopolar flow field plate. FTL 64a is situated adjacent a first flow field surface 56a of bipolar flow field plate 56.

Similarly, MEA 25b includes a cathode 62b/membrane 61b/anode 60b layered structure sandwiched between FTLs 66b and 64b. FTL 64b is situated adjacent a flow field end plate 54, which is configured as a monopolar flow field plate. FTL 66b is situated adjacent a second flow field surface 56b of bipolar flow field plate 56. It will be appreciated that N number of MEAs 25 and N−1 bipolar flow field plates 56 can be incorporated into a single UCA 50. It is believed, however, that, in general, a UCA 50 incorporating one or two MEAs 56 (N=1, bipolar plates=0 or N=2, bipolar plates=1) is preferred for more efficient thermal management.

The UCA configurations shown in FIGS. 1b and 1c are representative of two particular arrangements that can be implemented for use in the context of the present invention. These two arrangements are provided for illustrative purposes only, and are not intended to represent all possible configurations coming within the scope of the present invention. For example, the seal system 34 shown in FIG. 1b can be replaced or supplemented with other sealing systems, such as those disclosed herein. Rather, FIGS. 1b and 1c are intended to illustrate various components that can be selectively incorporated into a unitized fuel cell assembly packaged in accordance with the principles of the present invention.

By way of further example, a variety of sealing methodologies implemented in accordance with the present invention can be employed to provide the requisite sealing of a UCA comprising a single MEA disposed between a pair of monopolar flow field plates, and can also be employed to seal a UCA comprising multiple MEAs, a pair of monopolar flow field plates and one or more bipolar flow field plates. For example, a UCA having a monopolar or bipolar structure can be constructed to incorporate an in-situ formed solid gasket, such as a flat solid silicone gasket.

In particular embodiments, a UCA, in addition to including a sealing gasket, can incorporate a hard stop arrangement. The hard stop(s) can be built-in, disposed internal to the UCA, or integrated into the monopolar and/or bipolar flow field plates. Other features can be incorporated into a UCA, such as an excess gasket material trap channel and a micro replicated pattern provided on the flow field plates. Incorporating a hard stop into the UCA packaging advantageously limits the amount of compressive force applied to the MEA during fabrication (e.g., press forces) and during use (e.g., external stack pressure system). For example, the height of a UCA hard stop can be calculated to provide a specified amount of MEA compression, such as 30%, during UCA construction, such compression being limited to the specified amount by the hard stop. Incorporating a hard stop into the flow field plates can also act as a registration aid for the two flow field plates.

Moreover, a variety of UCA configurations can be implemented with a thermal management capability in accordance with other embodiments of the present invention. By way of example, a given UCA configuration can incorporate an integrated thermal management system. Alternatively, or additionally, a given UCA can be configured to mechanically couple with a separable thermal management structure, embodiments of which will be describe below. Accordingly, a fuel cell assembly of the present invention is not to be limited to a specific UCA configuration or to a particular thermal management system as described herein.

It is appreciated by one skilled in the art that advancements in fuel cell technology are needed in order to mass produce fuel cells and systems at marketable prices. Conventional fuel cell packaging approaches presently limit the ability to achieve high levels of fuel cell stack assembling efficiency. Moreover, current packaging and stacking approaches are presently not amenable to fuel cell component recycling, which results in wasteful scrapping of an entire fuel cell assembly once the fuel cell has been identified as a poor performer. Fuel cell recycling permits reuse of certain fuel cell assembly components once a defective fuel cell has been removed and subject to disassembly. A UCA packaging approach consistent with the principles of the present invention provides for efficient assembling and disassembling of fuel cell stacks and, further, provides for recycling of various UCA components.

Turning now to FIG. 2a, there is illustrated a cross-sectional view of a UCA in accordance with one embodiment of the present invention. According to this embodiment, UCA 80 incorporates in-situ formed flat, solid silicone gaskets and a hard stop arrangement. In the embodiment shown in FIG. 2a, and in other embodiments described herein, a liquefied silicone sealant can be employed. It is understood that silicone sealant material represents one of several types of materials suitable for use in the construction of a UCA in accordance with the present invention. Other sealing materials can alternatively be employed, assuming such materials exhibit appropriate elastic properties for sealing and are sufficiently durable for fuel cell environments.

The UCA 80 shown in FIG. 2a can be constructed according to the following illustrative process. Flow field plate 84 is placed on a flat surface with the flow channels 85 facing upwardly. The flow field plate 84, for purposes of example, is a 13 cm×13 cm plate having a 10 cm×10 cm flow channel area. It is noted that the flow field plates 84, 82 can be fabricated from a carbon/polymer composite material, graphite, metal or metal coated with conductive material.

A liquefied silicone sealant material is dispensed at a predetermined rate, such as a rate of about 0.35 mg/min, onto the surfaces of the flow field plate 84 where the gasket of the MEA will be formed. A suitable silicone material is D98-55, parts A and B, available from Dow Corning. The flow channel area 85 is covered by an 11 cm×11 cm FTL 88. A catalyst-coated membrane (CCM) 90, which represents a PEM coated with an anode catalyst material on one surface and a cathode catalyst material on the other surface, is placed on the lower FTL 88 with the CCM 90 center aligned to the FTL center.

An upper 11 cm×11 cm FTL 86 is placed on the CCM 90 with alignment of the respective centers. The FTLs 86, 88 are slightly larger than the CCM 90 to provide a space into which the silicone can flow and infiltrate into the porous carbon fiber of the FTLs 86, 88 to create an edge seal. This oversizing of the FTLs 86, 88 relative to the CCM 90 also prevents silicone from flowing into the flow channels 85, which would otherwise plug up the outer flow channels.

As shown, a membrane 91 of CCM 90 or the entire CCM 90 extends outwardly from the MEA to a position proximate a hard stop 92. This extended membrane or CCM portion provides for enhanced electrical isolation between the flow field plates 84 and 82.

It is understood, however, that membrane 91 or CCM 90 need not extend from the MEA as is illustrated in FIG. 2a and other figures. Further, is it understood that membrane 91 or CCM 90 can extend from the MEA to a position at some desired distance between the MEA and hard stop 92.

An external hard stop 92 is used within the UCA 80 as a shim to control MEA compression. The hard stop 92 can be fabricated from a variety of materials, including, for example, polyethylene napthalate (PEN), polyethylene terephthalate (PET), Teflon, or other incompressible material or a combination of such materials. In the embodiment shown in FIG. 2a, the external hard stop 92 is fabricated from PEN and coated with Teflon to ensure non-stickiness and removability after the UCA has formed. The thickness of hard stop 92 can be selected to achieve a desired amount of MEA compression. In FIG. 2a, the thickness of hard stop 92 is selected to ensure 30% compression of the MEA.

Liquefied silicone with two parts (A and B) premixed is dispensed at a rate of about 0.35 mg/min onto the surfaces of the upper flow field plate 82 and the lower flow field plate 84 where the gaskets of the MEA will be formed. The MEA components and external hard stops 92 are sandwiched between the two flow field plates 82 and 84 with the dispensed silicone. The entire sandwich structure 80 is then placed into a press. The sandwich structure 80 is preferably subject to press conditions of 270° F. at 3 tons for 10 minutes, which results in formation of UCA 80 with in-situ formed flat, solid gaskets. During the UCA forming process, FTLs 88, 86 and CCM 90 are bonded to form an MEA with good interfaces. It is noted that a full 10 minutes of bonding time is typically needed if the MEA has not previously been bonded. It is further noted that the silicone material may cure after a time much shorter than 10 minutes, and that the typical press/bonding time of 10 minutes cart be reduced in cases where the subject MEA is a previously bonded MEA.

FIG. 2b illustrates another embodiment of a UCA in accordance with the principles of the present invention. In this embodiment, an internal hard stop arrangement is employed, in addition to use of an in-situ formed silicone gasket. A 13 cm×13 cm flow field plate 84 with a 10 cm×10 cm flow channel area 85 is placed on a flat surface with the flow channels facing upwardly. This UCA configuration includes a trap channel 95 provided on each of the flow field plates 82, 84 within the silicone gasket formation region. As shown, the trap channel 95 is located between the hard stop arrangement 93a/93b and the outer periphery of the respective flow field plates 82, 84. The trap channels 95 provide a space for the excess liquefied silicone to flow into so as not to plug the flow channels. This can also provide an internal locking mechanism that enhances UCA packaging integrity, in addition to the requisite MEA sealing.

A liquefied silicone is dispensed at a rate of about 0.35 mg/min onto the surfaces of the flow field plate 84 where the gasket of the MEA will be formed. The amount of silicone dispensed on the plate surfaces can be reduced by about 50% of the amount calculated for FIG. 2a due to the presence of the integral hard stop arrangement.

The hard stop arrangement of the instant embodiment includes frames 93a and 93b formed from a suitable material such as PEN, PET, polyethylene, polypropylene, polyester, fiberglass, nylon, Delrin, Lexan, Mylar, Kapton, Teflon, or the like. Blends of these materials or composite materials of these with fillers such as carbon, glass, ceramic, etc. may also be used as hard stops. It is understood that the hard stop arrangement need not be a single continuous member, but may instead be defined by a number of unconnected or loosely connected discrete hard stop elements.

The frames 93a and 93b shown in FIG. 2b are fashioned from PEN. The PEN frame 93b in this embodiment has an outer dimension of 12.5 cm×12.5 cm and an 11 cm×11cm window. The frame 93b is placed on the flow field plate 84, such that the frame 93b covers much of the liquefied silicone 94. The thickness of the PEN frame 94 is selected to ensure 30% compression of the MEA.

An 11 cm×11 cm FTL 88 is placed into the inner window of the PET frame 93b. A CCM 90 is placed on the FTL 88, with the CCM center aligned to the FTL center. Another PET frame 93a with the same dimensions as frame 93b is placed on the CCM 90 with centers respectively aligned. The second 11 cm×11 cm FTL 86 is placed into the window of PEN frame 93a.

A liquefied silicone 94 is dispensed at a rate of about 0.35 mg/min onto the surfaces of The second flow field plate 82 where the gasket of the MEA will be formed. The second flow field plate 82 is placed on top of the flow field plate 84/FTL 88/CCM 9O/FTL 86 structure, and placed into a press, preferably under press conditions of 270° F., 3 tons for 10 minutes.

FIG. 3a illustrates another embodiment in which a built-in hard stop is employed in addition to an in-situ formed silicone gasket. The basic construction of UCA 80 shown in FIG. 3a is similar to that shown in FIG. 2b, with the exception of the hard stop configuration. In the embodiment shown in FIG. 3a, the hard stop feature is built into the flow field plates 82, 84. As shown, each of the flow field plates 82, 84 has a protruding peripheral edge 82a, 84a, best seen in FIG. 3b. The edges 82a, 84a are formed to register with one another and to provide a gap of a predetermined size between internal flow field plate surfaces sufficient to accommodate the silicone seal 94. The heights of the protruding peripheral edges 82a, 84a are selected to provide an appropriate degree of MEA compression.

As shown in FIG. 3b, the peripheral edge 82a includes a protruding interface and the peripheral edge 84a includes a recessed interface. The protruding interface of edge 82a is received by the recessed interface of edge 84a when the two flow field plates 82, 84 are brought together under pressure within the press. An insulating layer 89, such as an insulating film, is disposed between the peripheral edges 82a, 84a to provide the requisite electrical isolation between the two flow field plates 82, 84.

In accordance with another sealing approach, surfaces of the flow field plates can be machined to include a micro replicated pattern, often referred to as a microstructured surface. Various microstructure patterns and methods of producing same are known in the art. The microstructured patterns can be machined into particular regions of the flow field plates to provide mechanical coupling between flow field plates of the UCA upon engagement of the patterns provided on opposing flow field plate surfaces. The patterns, for example, can have a ridge having a width which can vary between 5 and 25 mils, and a height that can vary between about 1.5 and 2.5 mils.

For example, microstructured patterns can be machined into the flow field surfaces within the gasket region to form many small semi-ridges on the surface of the gasket. Microstructured patterns can also be machined into the flow field lands. As will be discussed in greater detail below, UCA sealing can be accomplished by the combined use of microstructured patterns and polymeric gaskets (e.g., in-situ formed silicone gaskets or separate elastomeric gaskets) or by sole use of microstructured patterns or other mechanical arrangements (e.g., locator pins, screws, bolts/nuts, interlocking surface features).

FIGS. 4a and 4b illustrate a further embodiment of a UCA which employs an internal hard stop and in-situ formed silicone seal or gasket. In accordance with this embodiment, the UCA 100 includes an upper flow field plate 102 that represents the cathode side of the fuel cell, and a lower flow field plate 104 that represents the anode side of the fuel cell. The hard stop arrangement 110, as best seen in FIG. 4b, includes a one-piece hard stop core or coil 112 positioned within a slot 114 provided in the lower flow field plate 104.

The slot 114 can be pre-machined or molded in place during the plate making process. The depth of the slot 114 can be varied according to the diameter of the hard stop core 112. A curved recess 116 is provided in the upper flow field plate 102 and has a radius matching that of the hard stop core 112. The lower flow field plate 104 can include a trap channel 105 for accommodating excess sealant material that may flow during gasket formation.

The hard stop coil 112, as with other hard stop embodiments described herein, can be formed from an incompressible material, such as PET, PEN, or Teflon. The thickness of the hard stop coil 112 typically ranges between 0.5 mm and 2.0 mm. In general, the thickness of the hard stop coil 112 should be about 70% of the MEA's thickness, which is typically about 0.012 inch thick.

A silicone gasket is formed by dispensing liquid silicone on top of the hard stop coil 112 prior to positioning the coil 112 within the slot 114. The hard stop coil 112 will then sink into the slot 114 and remain orientated along the centerline of the slot 114. This helps to maintain the same thickness of silicone layer proximate the hard stop coil 112. The MEA 106 and upper flow field plate 102 are properly situated, and the sandwich structure 100 is placed in a press under appropriate temperature and pressure conditions for a predetermined duration of time, as discussed previously.

It is noted that the size of the membrane can be the same as the FTLs. Even if the catalyst were unexpectedly exposed, this would not be a problem since the silicone forms to protect against exposing the catalysts to the fuels. If it is intended that the UCA be subject to recycling, an additional release coating can be applied on the surface of the flow field plates 102, 104 which will come into direct contact with the silicone gasket/sealing material. As such, the MEA and seal/gasket of a failed UCA can be readily separated from the reusable flow field plates 102, 104.

Turning now to FIGS. 5a–5f, there is illustrated a portion of a UCA which employs a sealing arrangement in accordance with another embodiment of the present invention. The embodiments depicted in FIGS. 5a–5f incorporate a thermoplastic sealing material, which is typically dispensed in the form of a film, tape, or other solid form. The thermoplastic can be a fluoroplastic like THV (terpolymer of tetrafluoroethylene, hexafluoropropylene and vinylidene difluoride); polyethylene; copolymers of polyethylene such as those of ethylene and acrylic acid; Thermo-Bond 845 (manufactured by 3M, e.g., a polyethylene maleic anhydride copolymer) and Thermo-Bond 668 (manufactured by 3M, e.g., a polyester). Blends of these materials or composite materials of these with fillers such as carbon, glass, ceramic, etc. may also be used as thermoplastics. Preferably, the melt range is 50–180° C., and more preferably 100–150° C., which should be similar to the MEA bonding temperature. The thermoplastic material should also adhere to the hard stop and flow field plate.

In certain UCA/MEA configurations, the thermoplastic sealing material provides for enhanced membrane edge protection, in addition to UCA sealing. Among other benefits, use of a solid thermoplastic sealing film significantly reduces or eliminates the risk of flow channel blockage that can occur with the use of liquefied sealants. Further, the FTLs can be positioned within the UCA/MEA to prevent the thermoplastic sealing film from flowing into the gas feed holes and channels.

One particular advantage to using a solid thermoplastic sealing film concerns the characteristic that such a sealing film melts into the FTL so there is no thickness variation on the edges of the FTL where the sealing film overlaps the FTL. Conventional methods of building MEAs, in contrast, can result in a small thickness variation on the edge of the MEA, thus producing a location that is subject to significantly more pressure then the rest of the MEA. If the MEA is subject to too much pressure along its edges, the MEA becomes prone to failure in those areas. Because a thermoplastic sealing film according to this embodiment has no effective thickness variation relative to the FTL surface once diffused therein, the MEA will absorb the pressure in the UCA stack equally across the entire MEA surface.

Another advantage of using a thermoplastic sealing film in accordance with this embodiment, as briefly discussed above, is membrane edge protection. In durability experiments, it has been found that a major cause of failure for MEAs is stress developing in the area between the FTL and gasket hard stop, which can cause tearing and produce massive hydrogen crossover. This crossover completely renders the MEA useless, and makes the rest of the UCA stack fail because it cannot deliver the hydrogen fuel to other MEAs in the stack.

This edge tearing phenomena can occur in certain MEA structures because there is often a pressure difference between the anode and cathode layers, and the membrane is weak in that area because there is little or nothing to support it. In this case, the thermoplastic sealing film melts over the membrane and provides a strong support that is not easily torn. The resulting membrane protected at the edge of the FTL has a higher potential for lifetime and reliable performance because the chances of failure on the edge are significantly reduced.

A further advantage of this UCA construction is membrane protection from sharp corners of the FTL. It has been seen in many cases, especially with a more rigid FTL, that sometimes the edges of the FTL can poke through the membrane and cause a short, thus causing the MEA to fail. Conventional approaches can only partially control this problem. According to the instant embodiment, a thermoplastic sealing film is preferably situated underneath the edges of the FTLs prior to bonding. The thermoplastic sealing film protects the membrane from falling victim to sharp edges during the bonding process. Employment of a thermoplastic sealing film according to this embodiment, in contrast to conventional approaches, completely eliminates FTL promoted membrane puncture from occurring.

The addition of a hard stop, in certain embodiments, provides the further advantage of precisely controlling compression within the UCA and stopping compression of the fuel cell when FTL compression has reached an optimal level. The thickness of the hard stop can be varied depending on the thickness of the FTL to provide an optimal compression value.

Figure 5A:
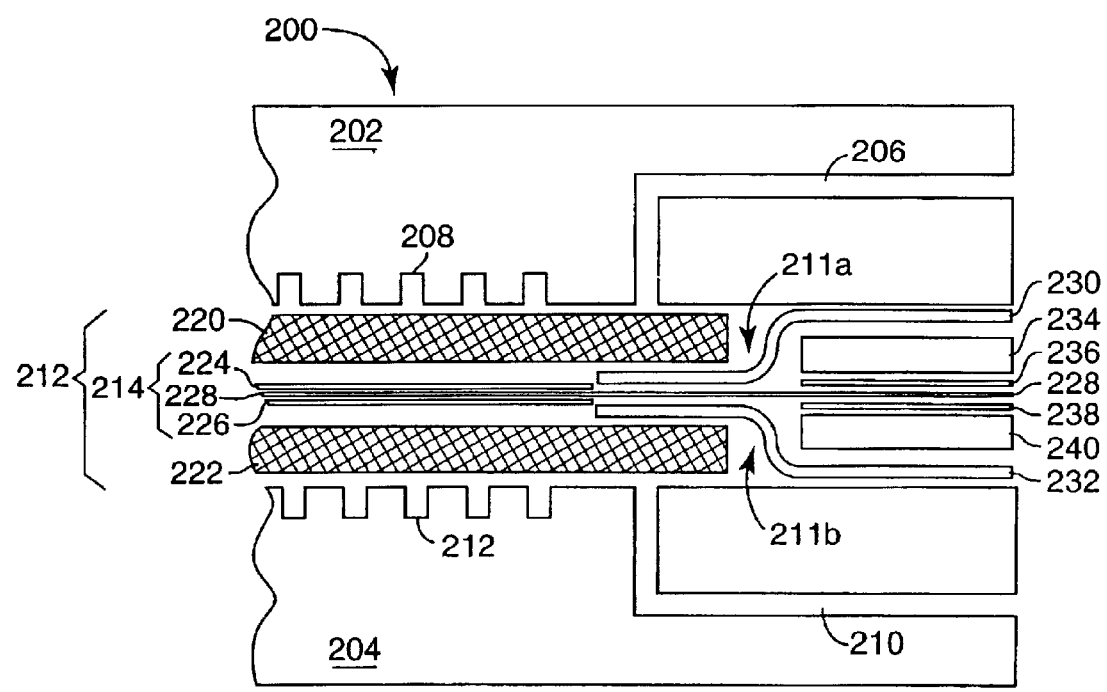
FIGS. 5a and 5b are schematic sectional views of a unitized cell assembly before and after a bonding process, respectively, the unitized cell assembly employing an internal hard stop arrangement and an in-situ formed thermoplastic sealing gasket in accordance with an embodiment of the present invention.
Figure 5B:
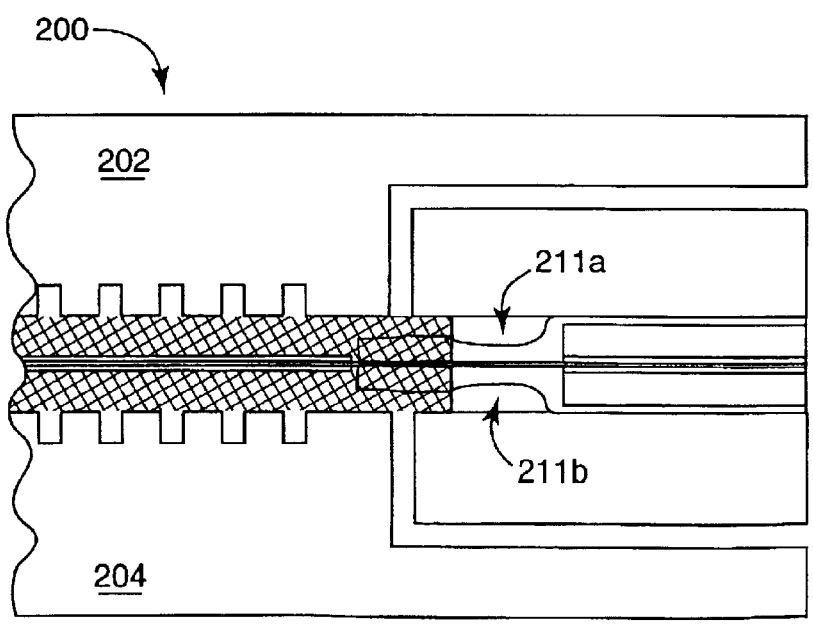

FIG. 5a illustrates an edge portion of a UCA prior to being placed in a bonding press, while FIG. 5b illustrates the UCA portion of FIG. 5a after completion of the bonding process. The UCA 200 includes first and second flow field plates 202, 204, each having a feed gas port 206, 210 and a number of gas flow channels 208, 212. Provided between the first and second flow field plates 202, 204 is an MEA 212. MEA 212 is shown to include a pair of FTLs 220, 222 between which a CCM 214 is situated. CCM 214 includes cathode and anode catalyst layers 224, 226 and a membrane 228 which extends outwardly from the MEA 212. As shown, the membrane 228 extends beyond the edges of the FTLs 220, 222 and terminates proximate the edges of the first and second flow field plates 202, 204.

The UCA 200 incorporates a hard stop arrangement which includes first and second hard stop frames 234, 240 situated between the membrane 228 and respective first and second flow field plates 202, 204. The hard stop frames 234, 240 can be fabricated from a suitable hard stop material, such as PET, PEN, Teflon or the like. The first hard stop frame 234 is retained in position on the membrane 228 by use of an adhesive film or layer 236 provided between the first hard stop frame 234 and membrane 228. Similarly, the second hard stop frame 240 is retained in position on the membrane 228 by use of an adhesive film or layer 238 provided between the second hard stop frame 240 and membrane 228.

A first end of a first thermoplastic film 230 is situated between the first FTL 220 and a portion of the membrane 228 that extends beyond the cathode catalyst layer 224. The first thermoplastic film 230 passes within a gap 211a formed between the end of the first FTL 220 and the first hard stop frame 234. In the configuration of FIG. 5a, the first thermoplastic film 230 is shown situated between the first hard stop frame 234 and the first flow field plate 202. A second end of the first thermoplastic film 230 terminates at the edge of the first flow field plate 202.

A first end of a second thermoplastic film 232 is situated between the second FTL 222 and a portion of the membrane 228 that extends beyond the anode catalyst layer 226. The second thermoplastic film 232 passes within a gap 211b formed between the end of the second FTL 222 and the second hard stop frame 240. In the configuration of FIG. 5a, the second thermoplastic film 232 is shown situated between the second hard stop frame 240 and the second flow field plate 204. A second end of the second thermoplastic film 232 terminates at the edge of the second flow field plate 204.

Each of the thermoplastic films 230, 232 is typically about 2.5 mils in thickness, and a single hard stop frame 234, 240 is typically about 5 mils in thickness. In a UCA configuration in which a single hard stop frame is employed, such as in the embodiment shown in FIGS. 5c–5d, the hard stop frame 235 in this case is about 10 mils in thickness. It is noted that the FTLs 220, 222 are typically about 8 mils in thickness. It will be appreciated that these dimensions will vary depending on a particular UCA design.

In accordance with another configuration, a first thermoplastic film 230 is situated between the first FTL 220 and the portion of the membrane 228 that extends beyond the cathode catalyst layer 224. The first thermoplastic film 230, according to this configuration, passes within the gap 211a and terminates at the edge of the first hard stop frame 234. An adhesive film or layer, similar to that of layer 236, is provided between the first hard stop frame 234 and the first flow field plate 202.

According to this embodiment, a second thermoplastic film 232 is situated between the second FTL 222 and the portion of the membrane 228 that extends beyond the anode catalyst layer 226. The second thermoplastic film 232, according to this configuration, passes within the gap 211b and terminates at the edge of the second hard stop frame 240. An adhesive film or layer, similar to that of layer 238, is provided between the second hard stop frame 240 and the second flow field plate 204.

FIG. 5b illustrates an edge protected UCA after completion of the bonding process. As can be seen in FIG. 5b, the various components of UCA 200 are held together by the melted thermoplastic films 230, 232. The thermoplastic material has impregnated the FTLs 220, 222, but has not seeped into the feed gas ports 206, 210. Moreover, strategic placement of the FTLs 220, 222 relative to the gas channels 208, 212 prevents gas channel blockage from developing during the bonding process. The membrane 228 has a healthy layer of melted thermoplastic material surrounding it at the vulnerable edge between the first and second stop frames 234, 240 and the first and second FTLs 220, 222.

Figure 5C:
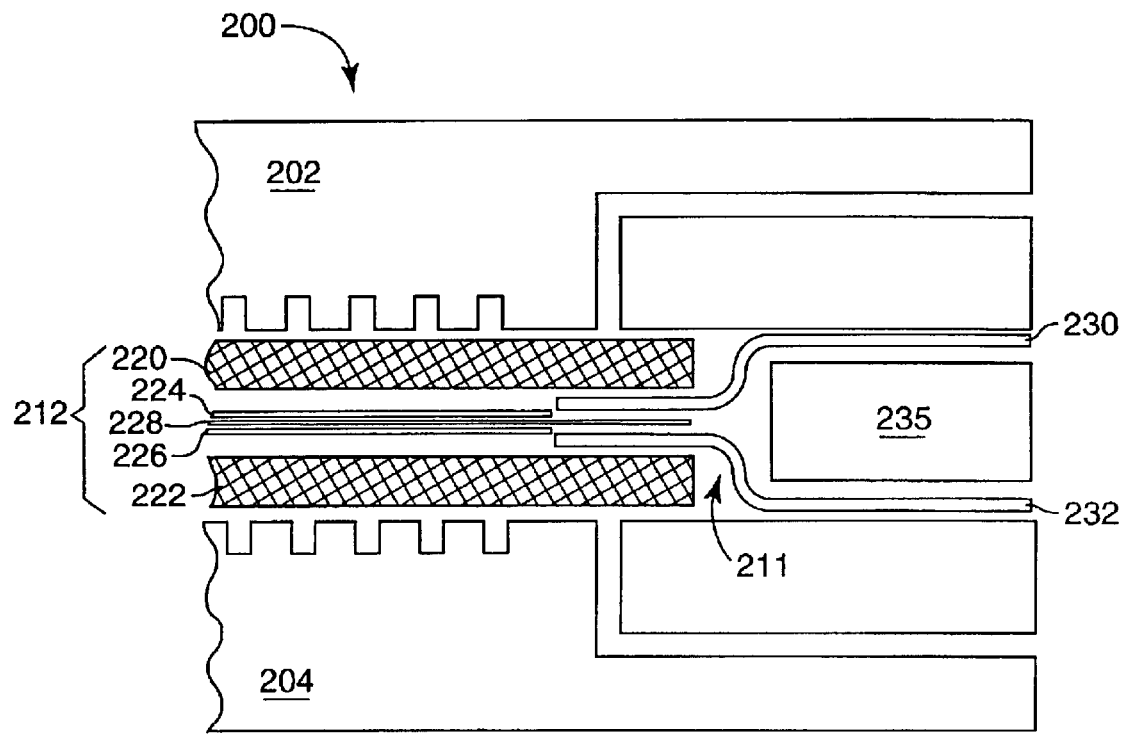
FIGS. 5c and 5d are schematic sectional views of a unitized cell assembly before and after a bonding process, respectively, the unitized cell assembly employing an internal hard stop arrangement and an in-situ formed thermoplastic sealing gasket in accordance with another embodiment of the present invention.
Figure 5D:
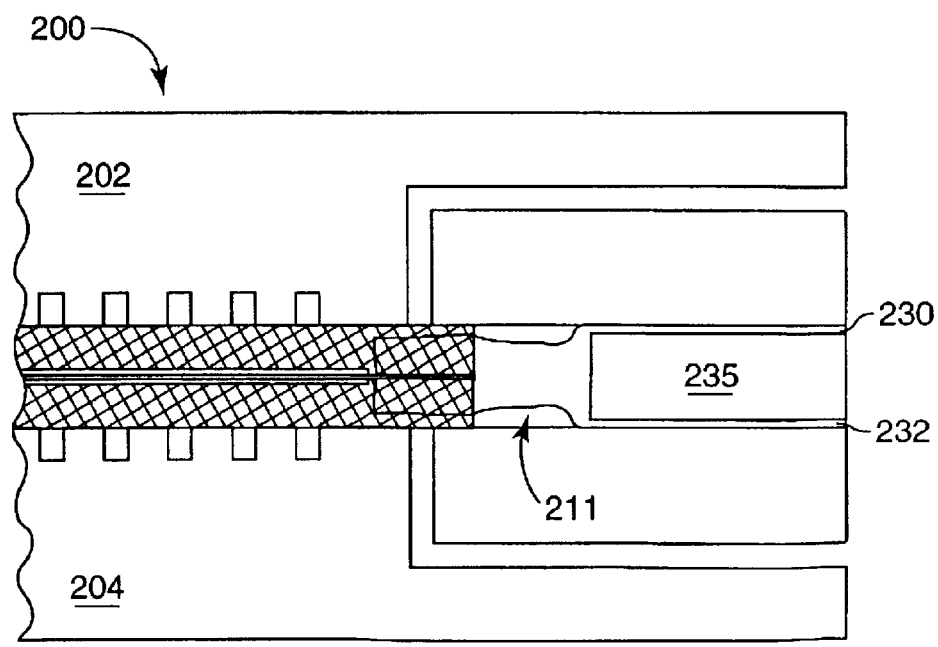

FIGS. 5c and 5d illustrate another embodiment of a UCA packaging configuration which incorporates a thermoplastic sealant material in combination with a hard stop arrangement. FIG. 5c illustrates an edge portion of a UCA prior to being placed in a bonding press, while FIG. 5d illustrates the UCA portion of FIG. 5c after completion of the bonding process. According to this embodiment, MEA 212 includes a membrane 228 that terminates at or near the edge of the first and second FTLs 220, 222. As in the embodiment of FIGS. 5a and 5b, first and second thermoplastic films 230, 232 in FIGS. 5c and 5d are situated between the membrane 228 that extends beyond the catalyst layers 224, 226 and the first and second FTLs 220, 222, respectively.

The first and second thermoplastic films 230, 232 respectively pass within the gap 211 formed between the end of the first and second FTLs 220, 222 and a hard stop frame 235. Because the membrane 228 does not extend beyond the hard stop arrangement, a single hard stop frame 235 can be employed. It is noted that the membrane 228 can extend into the gap 211 and to the hard stop frame 235 to provide for enhanced electrical isolation between the first and second flow field plates 202, 204.

The first and second thermoplastic films 230, 232 are shown situated between the hard stop frame 235 and the first and second flow field plates 202, 204, respectively. As in the configuration shown in FIGS. 5a and 5b, the first and second thermoplastic films 230, 232 can extend to, and terminate at, the hard stop frame 235, in which case an adhesive film or layer can be disposed between the hard stop frame 235 and the first and second flow field plates 202, 204, respectively.

Figure 5E:
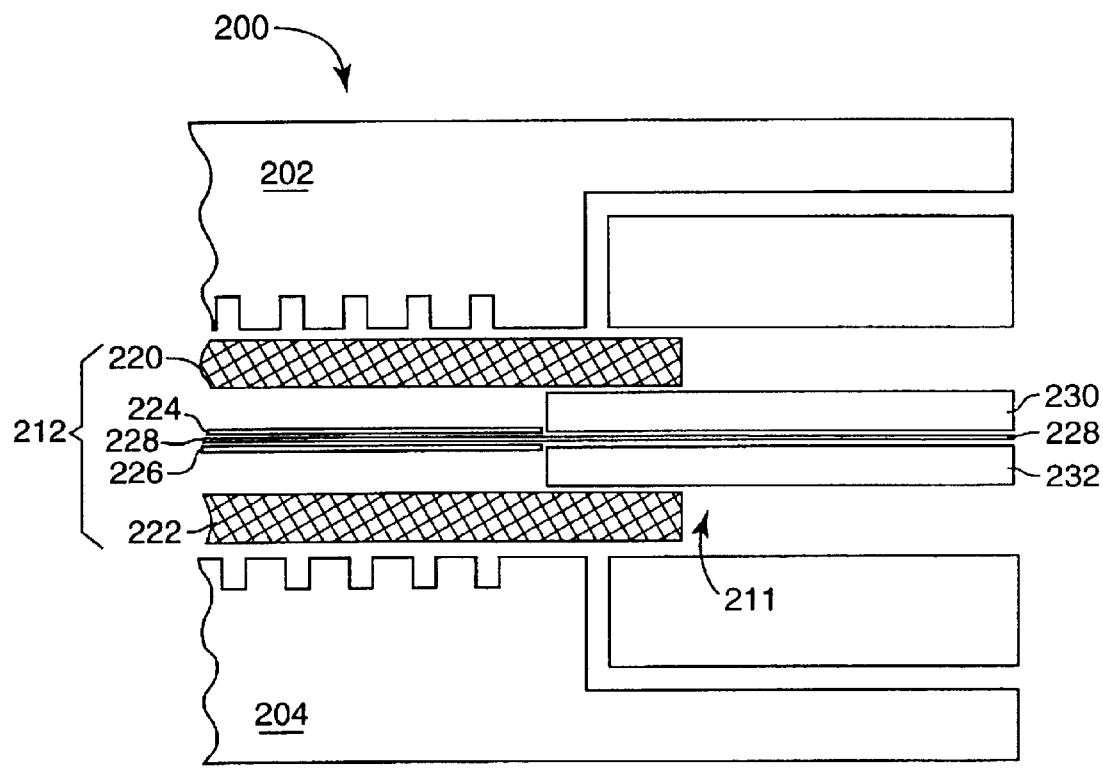
FIGS. 5e and 5f are schematic sectional views of a unitized cell assembly before and after a bonding process, respectively, the unitized cell assembly employing an in-situ formed thermoplastic sealing gasket and excluding a hard stop arrangement in accordance with a further embodiment of the present invention.
Figure 5F:
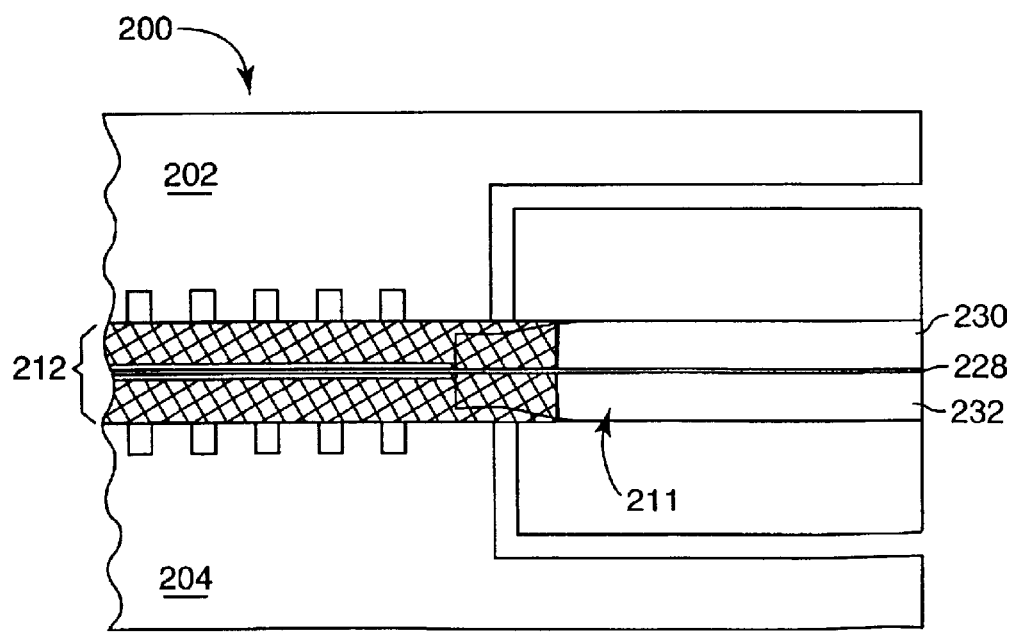

FIGS. 5e and 5f illustrate a further embodiment of a UCA which incorporates a thermoplastic sealant material in accordance with the present invention. In this embodiment, a hard stop arrangement is not employed, as is the case in the embodiments shown in FIGS. 5a–5d. FIG. 5e illustrates an edge portion of a UCA 200 prior to being placed in a bonding press, while FIG. 5f illustrates the UCA portion of FIG. 5e after completion of the bonding process.

According to this embodiment, MEA 212 includes a membrane 228 that extends outwardly from the MEA 212 and terminates at or near the edge of the respective first and second flow field plates 202, 204. A first thermoplastic film 230 is situated between the first FTL 220 and the portion of the membrane 228 that extends beyond the cathode catalyst layer 224. The first thermoplastic film 230, according to this configuration, is situated on the extended portion of the membrane 228 and terminates at the edge of the first flow field plate 202.

A second thermoplastic film 232, according to this embodiment, is situated between the second FTL 222 and the portion of the membrane 228 that extends beyond the anode catalyst layer 226. The second thermoplastic film 232 is situated on the extended portion of the membrane 228 and terminates at the edge of the second flow field plate 202. It is understood that the membrane 228 need not extend beyond the edge of the MEA 212 or all the way to the edge of the respective first and second flow field plates 202, 204.

Moving now to another aspect of the present invention, further embodiments are directed to a UCA assembly provided with a thermal management feature. In certain embodiments, the thermal management feature includes a cooling structure that is separable with respect to the UCA. In other embodiments, the thermal management feature includes a cooling structure that is integrally incorporated into the UCA package. In further embodiments, the UCA cooling structure, which can be integral or separable with respect to the UCA, is implemented to facilitate efficient assembling and disassembling of a stack of UCAs.

In accordance with other embodiments, various locking/engagement arrangements are employed to facilitate easy insertion and removal of UCAs assembled in UCA stacks. In further embodiments, various locking/engagement arrangements are employed to facilitate easy insertion and removal of an MEA with respect to a pair of flow field plates. These and other features will now be described in greater detail.

In general, a fuel cell stack comprising flow field plates, MEAs, and cooling structures is generally assembled by carefully aligning all components, and pressing these components together so each fuel cell is subjected to a specific amount of compression. Conventional fuel cell stack building utilizes a tie rod approach with fixed holes that pass inside the flow field plates to compress the stack. Should a cell fail, the faulty cell would need to be removed and possibly replaced in order for the stack or module to continue operation.

With conventional fuel cell stack assemblies, the process of removing or replacing a bad cell or a bad section of the stack is complex and time consuming. In order to remove one defective cell from a fuel stack assembled using conventional approaches, for example, the entire stack has to be taken apart and subsequently completely rebuilt. This involves removing all tie rods and each cell, followed by rebuilding of the whole stack after removing the failed cell from the stack.

A fuel cell stacking approach consistent with the principles of the present invention provides for efficient removal and replacement of defective cells within a stack assembly, which advantageously reduces the complexity and time expenditure associated with stack dissembling and reassembling. Further, a fuel cell stacking approach of the present invention provides for enhanced recycling of fuel cell components, thus allowing for reuse of certain fuel cell components (e.g., flow field plates, hard stop components, elastomeric seals, cooling components, etc.) of a defective fuel cell assembly removed from the stack.

Figure 6A:
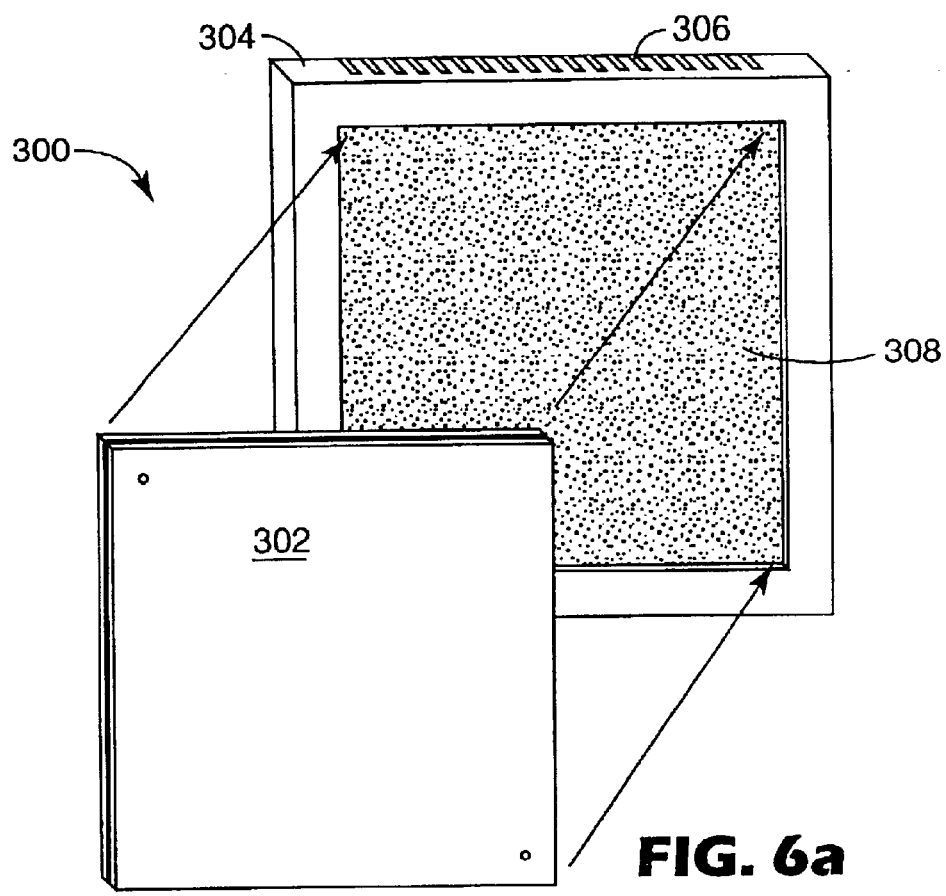
FIGS. 6a–6c show a unitized cell assembly system which includes a monopolar unitized cell assembly and a separable cooling structure in accordance with an embodiment of the present invention.
Figure 6B:
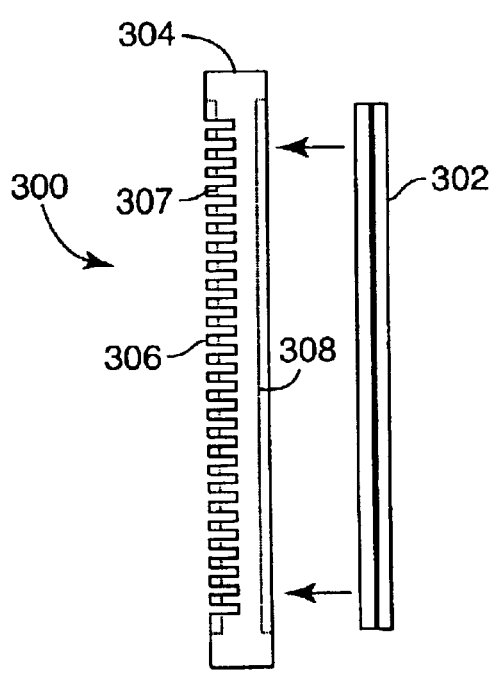
Figure 6C:
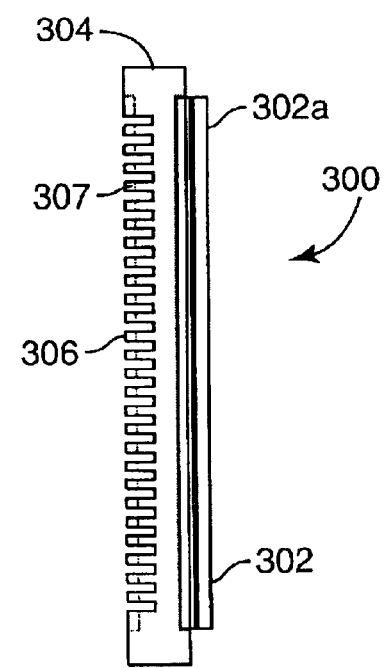

In accordance with one thermal management configuration, and as illustrated in FIGS. 6a–6c, a UCA assembly 300 is shown as including a UCA 302 and a separable cooling plate 304. UCA 302 in this embodiment is configured to have a rectangular or square block shape, it being understood that other shapes and configurations are possible. The cooling plate 304 includes a recessed surface 308 which is dimensioned to receive the UCA 302. One or more surfaces, such as a back surface and/or a side surface(s) of cooling plate 304, are provided with a cooling arrangement 306, such as cooling channels or fins. A fluid heat transfer medium, such as air, water, or other gaseous or fluidic coolant, can be passed through or over the cooling arrangement 306 to control the temperature of the UCA 302 (i.e., heating and/or cooling or UCA 302).

As can be seen in FIGS. 6b and 6c, a first UCA 302 can be fit into the recess 308 provided on a first surface of the cooling plate 304. In addition, a second surface of the cooling plate 304, such as the surface which includes the cooling arrangement 306, can include a recess 307 which is dimensioned to receive a second UCA 302. In this manner, a single cooling plate 304 can be used to provide cooling and aligned engagement with two UCAs 302.

Accordingly, the stack of UCA assemblies 300 can be interlocked by use of the recessed fit relationship between UCAs 302 and cooling plates 304. It is noted that, in an alternative configuration, a recess can be provided on one or more surfaces of the UCAs 302, and that the cooling plates 304 can be configured to include one or more protruding surfaces that fit into the associated recessed surfaces of the UCAs 302.

Figure 7A:
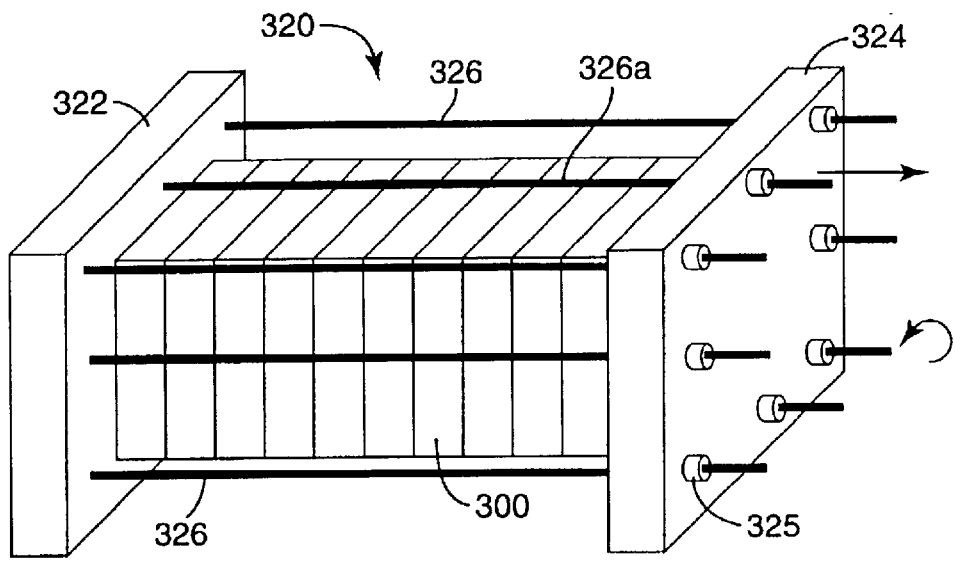
FIGS. 7a and 7b illustrate a stack of unitized cell assemblies disposed within a compression system in accordance with an embodiment of the present invention.
Figure 7B:
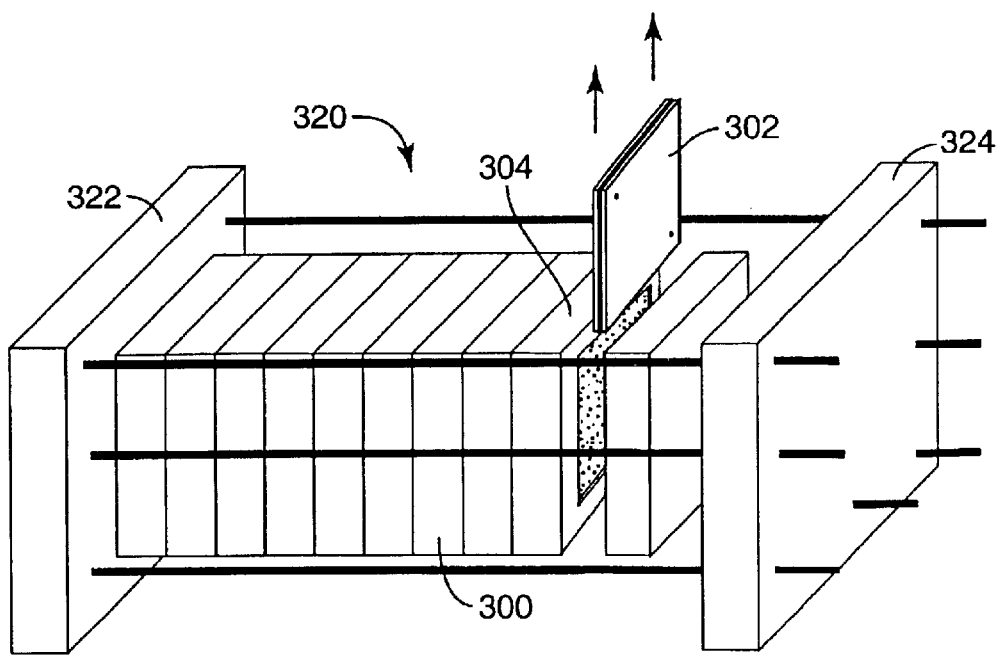

The recessed fit as between the UCA 302 and cooling plate 304 provides for both ease of alignment and ease of insertion/removal there between. According to this implementation, and as best seen in FIGS. 7a and 7b, a stack of UCA assemblies 300 (i.e., UCAs 302 with associated cooling plates 304) can be compressed using a compression apparatus 320 in which the tie rods 326 are situated completely outside of the UCA assemblies 300. With this design, no special alignment is needed for stack assembly. Removing or replacing a particular cell within the stack system requires significantly less work than conventional approaches that use tie rods that pass through the flow field plates.

The compression apparatus 320 shown in FIGS. 7a and 7b includes a pair of end plates 322, 324 between which a number of tie rods 326 extend. The fuel and coolant manifolds and alignment pins are not shown for simplicity of explanation. Initially, each UCA 302 is placed within the recess 308 of its associated cooling plate 304, the combination of which defines a UCA assembly 300 within the context of this embodiment. The tie rods 326 are threaded into holes provided within the respective end plates 322, 324.

As shown, one of the tie rods 326a can initially be left uninstalled in order to facilitate insertion of the UCA assemblies 300 into the compression apparatus 320. After all UCA assemblies 300 are inserted, nuts 325 are threaded onto associated tie rods 326 and tightened to generate an appropriate amount of stack compression (e.g., about 150 psi). A torque wrench can be used to tighten the nuts 325 by the desired amount. It can be seen that the recess fit as between UCAs 302 and cooling plates 304 precisely aligns the UCA 302 within the stack and prevents the UCAs 302 from slipping out during stack assembling and disassembling.

As shown in FIGS. 7a and 7b, a single tie rod 326a can be removed to facilitate removal of a defective UCA 302 from the stack. As is illustrated, a tie rod 326a is removed and all other tie rods 326 are loosened. The failed UCA 302 is removed. A replacement UCA 302 can then be inserted into the cooling plate recess from which the failed UCA 302 was removed. Alternatively, the cooling plate 304 associated with the removed UCA 302 can itself be removed from the stack, resulting in one less UCA assembly 300 within the stack. The previously removed tie rod 326a is replaced and all tie rods 326 are retightened by the appropriate amount.

With a recess fit design according to this embodiment, the fuel cell stack need only be loosened and the bad cells (UCAs) removed and either replaced or retightened with one less cell (UCA) in the stack. The recess fit design advantageously provides precise alignment of all the cells (UCAs) in a module so they are in the exact same position. The cells (UCAs) are not permitted to shift or slide around, which can otherwise create high compression gradients or bad seals. Since the tie rod holes are no longer located within the flow field plates, the flow field plates are less complicated and costly to produce. In addition, there are fewer seals to be made because there are no tie rod holes that require sealing on both sides of each flow field plate. By reducing the number of seals, a corresponding reduction in crossovers and leaks can be achieved.

Figure 6D:
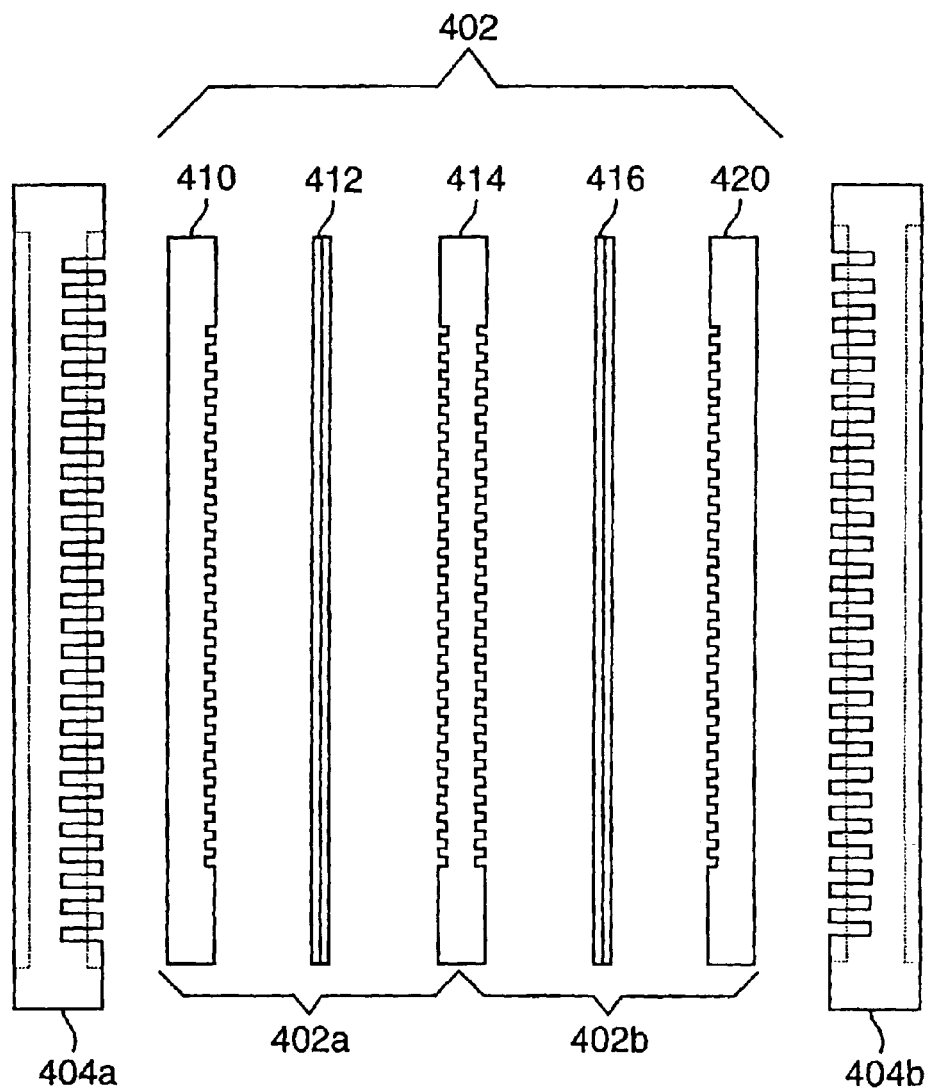
FIG. 6d shows a unitized cell assembly system which includes a monopolar/bipolar unitized cell assembly and a separable cooling structure in accordance with another embodiment of the present invention.

FIG. 6d illustrates another embodiment of a recyclable UCA assembly in accordance with the principles of the present invention. As in the embodiment illustrated in FIGS. 6a–6c, the UCA configuration shown in FIG. 6d employs separable cooling plates 404a, 404b and a similar recessed fit interlocking mechanism. The UCA assembly design shown in FIG. 6d can similarly be employed to construct a fuel cell stack that employs a compression apparatus as shown in FIGS. 7a and 7b.

The UCA assembly illustrated in FIG. 6d includes a bipolar UCA 402 which effectively incorporates two UCAs 402a, 402b. The bipolar UCA 402 is situated between a pair of cooling plates 404a, 404b. The UCA 402 includes a first monopolar flow field plate 410, a bipolar flow field plate 414, and a second monopolar flow field plate 420. A first MEA 412 is situated between the first flow field plate 410 and the biplolar flow field plate 414, and a second MEA 416 is situated between the second flow field plate 420 and the biplolar flow field plate 414. Cooling of the first MEA 412 is provided primarily by cooling plate 404a, and the second MEA 416 is cooled primarily by cooling plate 404b.

FIG. 6d illustrates a UCA packing configuration in which various components of the UCA can be recycled in cases where a defective MEA is identified. Assuming that the UCA's sealing gasket arrangement is provided by a removable elastomeric seal arrangement or a thermoplastic seal arrangement as previously described, a defective UCA can be removed from the cell stack and subject to disassembly. In one approach, a defective bipolar UCA assembly 402 as shown in FIG. 6d, for example, can be removed from its associated cooling plates 404a, 404b and replaced by an operable bipolar UCA assembly 402 in a manner described previously with respect to a monopolar UCA implementation.

According to another approach, a defective bipolar UCA assembly can be removed and further disassembled to remove each of the two MEAs from the bipolar UCA package. For example, the bipolar UCA assembly can be heated to soften or re-flow the in-situ formed thermoplastic seal arrangement. The flow field plates 410, 414, and 420 can then be separated to expose the two MEAs 412, 416. The defective MEA or MEAs can then be removed. The flow field plates 410, 414, 420 can then be cleaned and prepared for reuse. As mentioned previously, a release coating can be applied to the surfaces of the flow field plates where the in-situ gasket is to be formed to facilitate easy disassembling of the UCA components.

Referring now to FIGS. 8a–8c, there is illustrated an embodiment of a UCA assembly which employs a locking or engagement capability in accordance with the present invention. The UCA 500 includes a first flow field plate 502 and a second flow field plate 504. The first flow field plate 502 further includes a recessed surface 512 dimensioned to receive an MEA. The second flow field plate 504 also includes a recessed surface 514 dimensioned to receive an MEA.

The first flow field plate 502 incorporates a cooling arrangement 510 which, in this particular embodiment, is integral to the first flow field plate 502. The cooling arrangement 510 can, for example, include cooling channels, fins, or other structures that facilitate the transport of a thermal transfer medium over or through the rear surface of the first flow field plate 502.

The UCA 500 shown in FIGS. 8a–8c incorporates a locking or engagement arrangement 506 that facilitates precise alignment and easy assembling of UCAs when constructing a stack 501 of UCAs. In the embodiment shown in FIGS. 8a–8c, the locking arrangement 506 includes mechanical locking structures 520 and 524 provided at opposing ends of the first and second flow field plates 502 and 504, respectively. The locking structure 524 includes a protruding surface of the second flow field plate 504, preferably located near the peripheral edge of the second flow field plate 504. The locking structure 520 includes a recessed surface of the first flow field plate 502, also preferably located near the peripheral edge of the first flow field plate 502.

The respective locking structures 520, 524 provide for an aligned recessed fit between the first and second flow field plates 502 and 504, and between the assembled UCA 500 and an adjacent UCA equipped with respective locking structures 520, 524. It is understood that the locking structures 520, 504 are electrically isolated from one another by use of a suitable insulating material.

This mechanical locking arrangement provides for easy assembling and disassembling of a stack 501 of UCAs 500, as is shown in FIG. 8c. It will be appreciated that other recessed and protruding surface configurations can be employed to implement a mechanical locking capability according to this embodiment of the present invention. For example, first flow field plate 502 can incorporate a recessed surface which receives a protruding surface provided on the second flow field plate 504.

Other mechanical locking arrangements can be employed to permit mechanical coupling and decoupling of opposing flow field plates of a UCA. Such arrangements provided with the flow plates include the use of locator pins, hook and loop material, microstructured patterns, screws, bolts, snap-together coupling features, and other types of mechanical fasteners.

Turning now to FIGS. 9a–9e, there is illustrated a UCA assembly which incorporates an integral cooling arrangement in accordance with an embodiment of the present invention. This embodiment includes a number of advantageous features, including registration and alignment features, mechanical locking structures, and an integral cooling arrangement, among other features. Some or all of these features can be incorporated into a UCA assembly in accordance with the present invention.

Figure 9A:
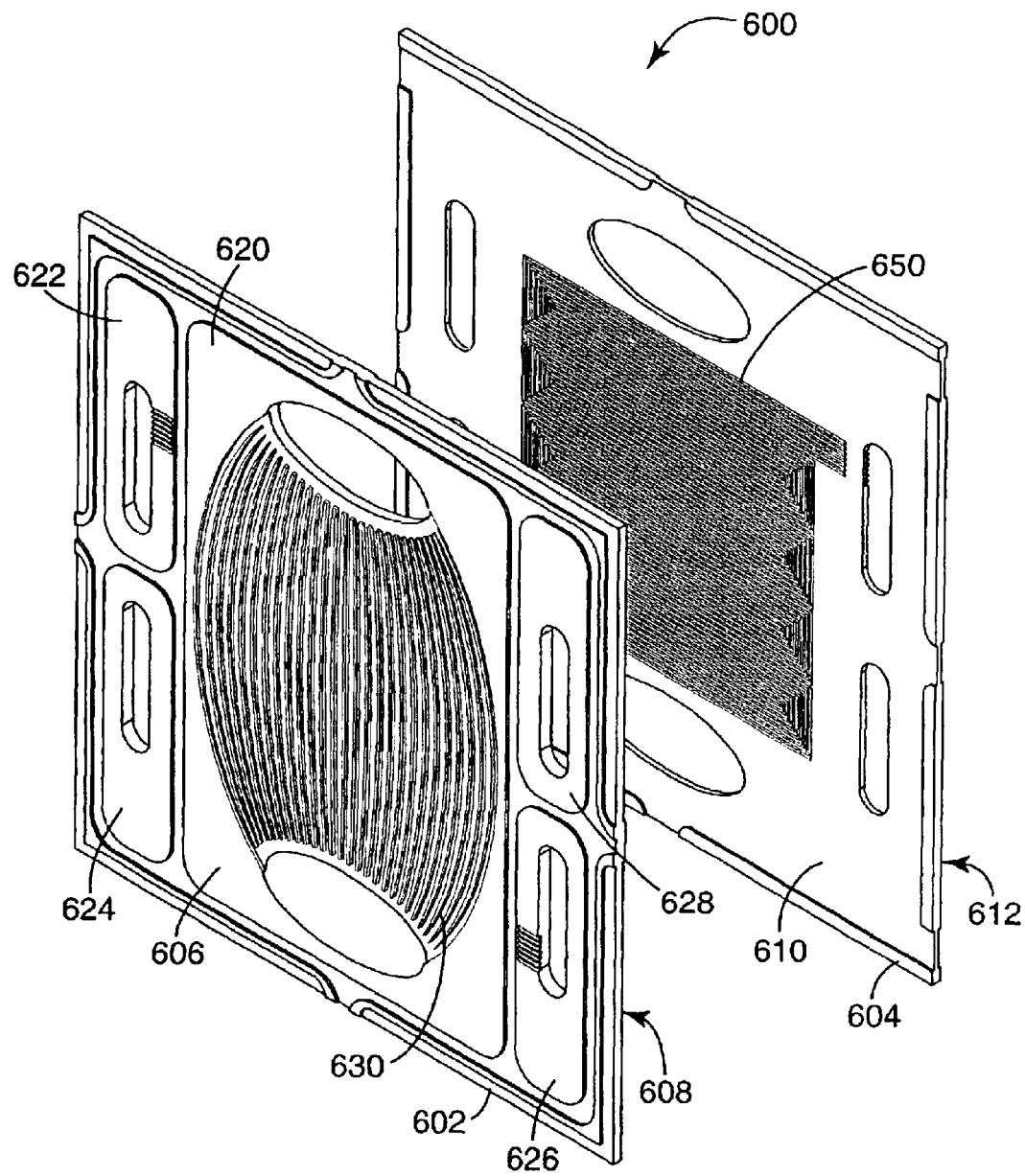

FIG. 9a shows two plates 602, 604 that, together with an MEA situated there between (not shown), define a UCA 600. Plate 602 includes a first surface 606, which incorporates an integral cooling arrangement 630, and a second surface 608, which includes a flow field. The first surface 606 of plate 602 is shown in FIG. 9e and the second surface 608 of plate 602 is shown in FIG. 9b. Plate 604 shown in FIG. 9a incorporates a flow field 650 on a first surface 610 and has a smooth region on a second surface 612. The first surface 610 of plate 604 is shown in FIG. 9c, and the second surface 612 is shown in FIG. 9d.

Plates 602 and 604 are provided with locking structures that facilitate a recessed fit as between repeating pairs of plates 602, 604 that define the UCAs of a fuel cell stack. As best shown in FIG. 9a, the first and second plates 602, 604 matingly engage one another in the orientation shown, such that the second surface 608 of plate 602 matingly engages the first surface 610 of plate 604. Recessed and protruding surfaces provided along the edges of the first and second plates 602, 604 define the primary engagement or locking structures of the UCA 600. When brought together, these surfaces engage to provide a mechanically sound recessed fit.

After two such UCAs 600 are assembled, the two UCAs 600 are mechanically coupled to one another vis-à-vis the recessed fit between the first surface 606 of plate 602 of a first UCA 600 and the second surface 612 of the second plate 604 of a second UCA 600. In this manner, any number of UCAs 600 can be assembled to construct a given fuel cell stack.

In addition to providing registration, alignment, and interlocking capabilities, various recessed, smooth, and protruding surfaces of UCA plates 602 and 604 are configured to facilitate sealing of the various regions of the UCA, such as the cooling region 620, fuel manifold regions 622, 624, 628, and 626, and peripheral edge regions of the UCA.

The first surface 606 of plate 602, as shown in FIGS. 9a and 9e, includes a cooling region 620 within which a coolant dispersion field 630 is provided between coolant manifold ports 634 and 632. Fuel inlet and outlet ports 690, 688, 682, and 692 are defined within fuel manifold regions 622, 624, 628, and 626, respectively. The fuel manifold regions 622, 624, 628, 626 and cooling region 620 are raised surfaces relative to the base surface of plate 606. These raised surfaces are configured to be received by corresponding recessed and/or smooth surfaces provided on the second surface 612 of plate 604.

In particular, the raised cooling region 620 provided on surface 606 of plate 602 of a first UCA 600 is configured to engage, and establish a seal, with smooth surface 700 provided on the second surface 612 of plate 604 of a second UCA 600. Raised fuel manifold regions 622, 624, 628, and 626 provided on the first surface 606 of plate 602 of a first UCA 600 are configured to engage, and establish a seal, with smooth surfaces proximate fuel manifold regions 652, 662, 660, and 658 provided on the second surface 612 of plate 604 of a second adjacent UCA 600. Fuel ports 635 and 637 provided in fuel manifold regions 622 and 626 allow for the passage of fuels to pass through the flow fields of the UCA 600.

The second surface 608 of the first plate 602 includes a flow field 680, as is shown in FIG. 9b. The flow field 680 includes a fuel inlet 684 and a fuel outlet 686. The fuel inlet 684 is fluidly coupled to fuel port 635 provided on the first surface 606 of plate 602, as can be seen in FIG. 9e. The fuel outlet 686 is fluidly coupled to fuel port 637 provided on the first surface 606 of plate 602.

In a similar manner, the first surface 610 of the second plate 604 includes a flow field 650, as is shown in FIG. 9c. The flow field 650 includes a fuel inlet 656 and a fuel outlet 654. The fuel inlet 656 is fluidly coupled to fuel port 701 provided on the second surface 612 of plate 604, as can be seen in FIG. 9d. The fuel outlet 654 is fluidly coupled to fuel port 703 provided on the second surface 612 of plate 604.

During construction of the UCA 600, an MEA is properly positioned on one of the flow fields 680, 650 of the first or second plates 602, 604. One or more hard stop frames can also be positioned on the plate 602 or 604. A preformed seal or an in-situ formed seal (e.g., liquefied silicone or thermoplastic seal) can be provided in a manner previously discussed.

Various other mechanical coupling approaches may alternatively or additionally be employed, such as locator pins, hook and loop material, microstructured patterns, screws, bolts, snap-together coupling features, and other types of mechanical fasteners as previously discussed. The plates 602, 604 can be machined or formed from a metal, carbon or a composite material, such as a conductive graphite or carbon/polymer composite material, for example.

After construction, the UCA 600 can be arranged with other such UCAs 600 during fuel cell stack assembly. As in other embodiments, the UCA 600 shown in FIGS. 9a–9e can be subject to recycling in a manner previously discussed should the UCA 600 operate poorly.

Figure 10:
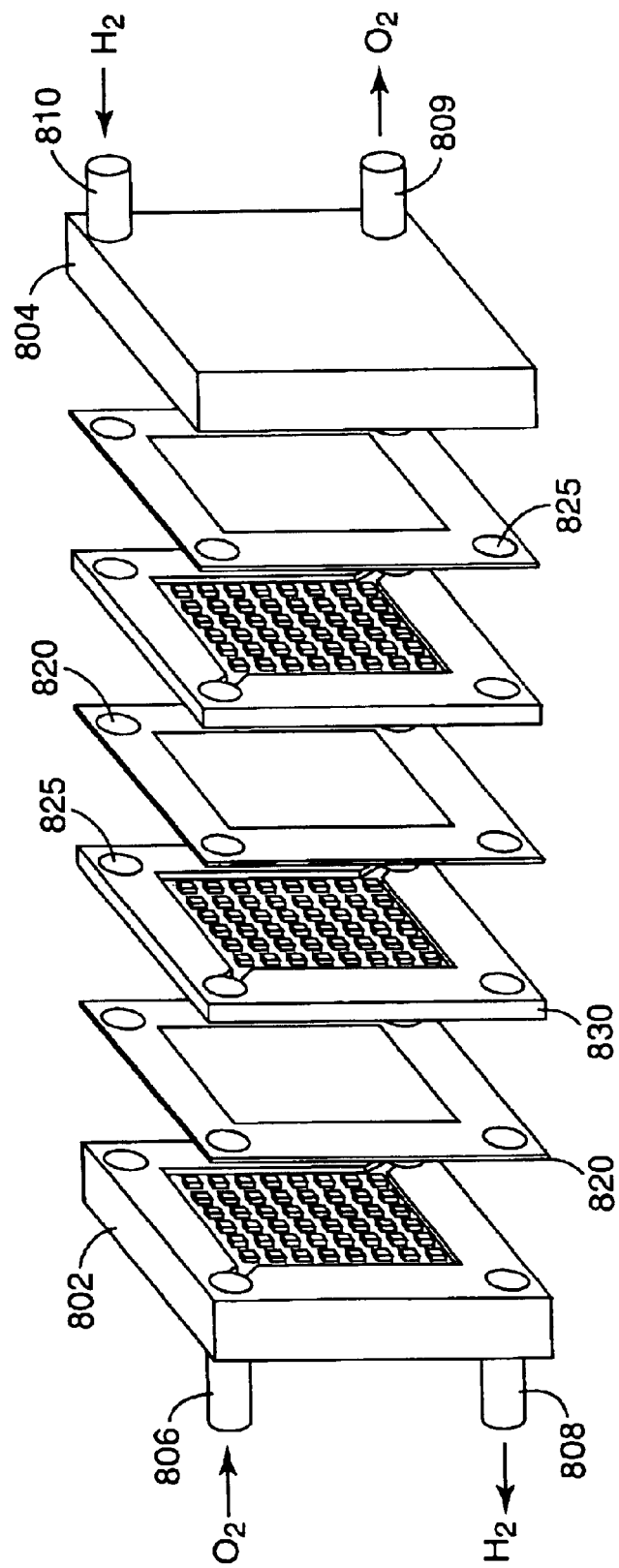
FIG. 10 is an illustrative depiction of a simplified fuel cell stack that facilitates an understanding of the manner in which fuels pass into and out of a stack of fuel cells, wherein the fuel cells are preferably configured as unitized cell assemblies in accordance with the principles of the present invention.

FIG. 10 is a depiction of a simplified fuel cell stack that facilitates an understanding of the manner in which fuels pass into and out of the stack. It is understood that several UCAs having a construction described hereinabove are intended to be employed in a stack of the type generally depicted in FIG. 10, and that the particular components and configuration of the stack shown in FIG. 10 are provided for illustrative purposes only. Those skilled in the art will readily appreciate that a fuel cell stack of the type contemplated in the instant application can be assembled using UCAs constructed in accordance with the principles of the present invention.

The fuel cell stack 800 shown in FIG. 10 includes a first end plate 802 and a second end plate 804. Each of the end plates 802, 804 includes a flow field plate, which is configured as a monopolar flow field plate. A number of MEAs 820 and bipolar flow field plates 830 are situated between the first and second end plates 802, 804. These MEA and flow field components are preferably of a type described hereinabove, it being understood that cooling arrangements can also be incorporated into the stack 800.

The first end plate 802 includes a first fuel inlet port 806, which can accept oxygen, for example, and a second fuel outlet port 808, which can discharge hydrogen, for example. The second end plate 804 includes a first fuel outlet port 809, which can discharge oxygen, for example, and a second fuel inlet port 810, which can accept hydrogen, for example. The fuels pass through the stack in a specified manner via the various ports provided in the endplates 802, 804 and manifold ports 825 provided on each of the MEAs 820 and flow field plates 825 (e.g., UCAs) of the stack 800.

Figure 11:
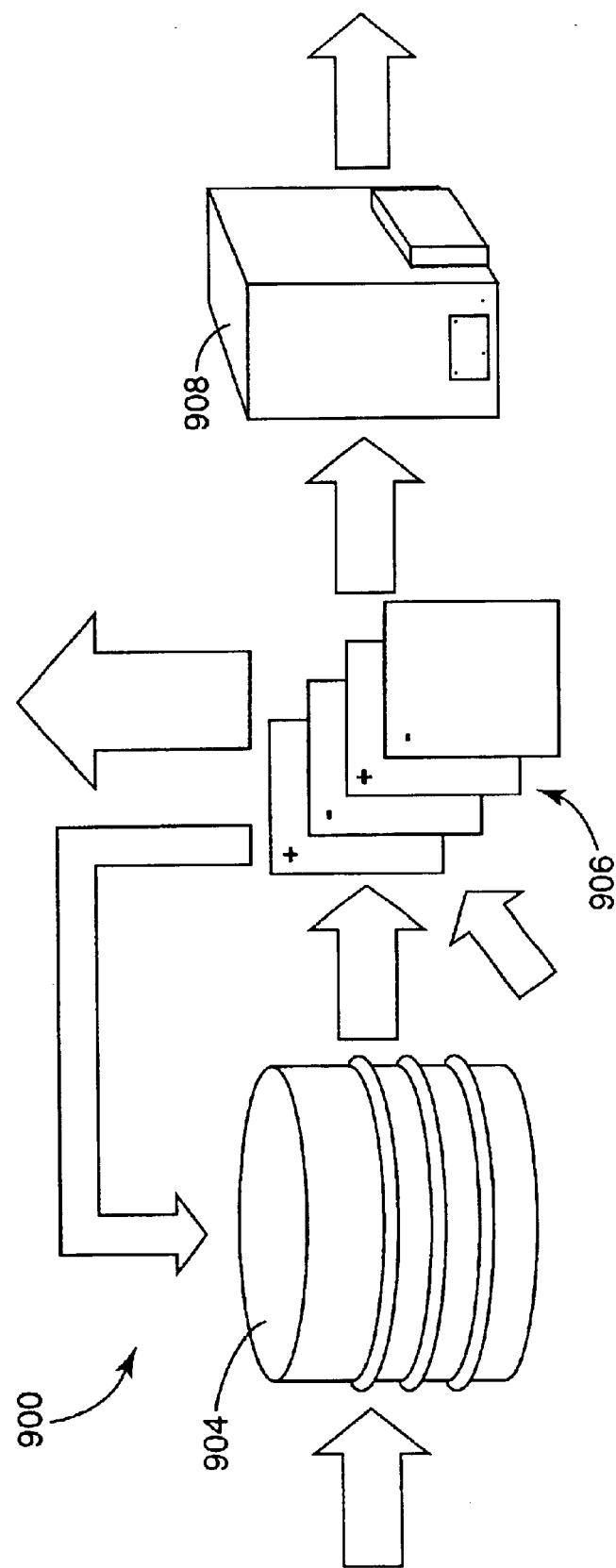
FIG. 11 illustrates a fuel cell system within which one or more fuel cell stacks employing unitized cell assemblies of the present invention can be employed.

FIG. 11 illustrates a fuel cell system within which one or more fuel cell stacks employing UCAs of the present invention can be employed. The fuel cell system 900 shown in FIG. 11 illustrates one of many possible systems in which UCA-based fuel cell stacks can find utility.

The fuel cell system 900 includes a fuel processor 904, a power section 906, and a power conditioner 908. The fuel processor 904, which includes a fuel reformer, receives a source fuel, such as natural gas, and processes the source fuel to produce a hydrogen rich fuel. The hydrogen rich fuel is supplied to the power section 906. Within the power section 906, the hydrogen rich fuel is introduced into the stack of UCAs of the fuel cell stack(s) contained in the power section 906. A supply of air is also provided to the power section 906, which provides a source of oxygen for the stack(s) of fuel cells.

The fuel cell stack(s) of the power section 906 produce DC power, useable heat, and clean water. In a regenerative system, some or all of the byproduct heat can be used to produce steam which, in turn, can be used by the fuel processor 904 to perform its various processing functions. The DC power produced by the power section 906 is transmitted to the power conditioner 908, which converts DC power to AC power for subsequent use. It is understood that AC power conversion need not be included in a system that provides DC output power.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A unitary fuel cell assembly, comprising:
   a first field plate;
   a second flow field plate;
   a membrane electrode assembly (MEA) provided between the first and second flow field plates, the MEA comprising first and second fluid transport layers (FTLs) and a membrane provided between anode and cathode catalytic layers;
   a hard stop arrangement provided between the first and second flow field plates; and
   a thermoplastic material provided between at least a portion of the first and second FTLs and within a gap defined between the first and second FTLs and the hard stop arrangement.

2. The assembly of claim 1, wherein the hard stop defines a unitary hard stop structure.

3. The assembly of claim 1, wherein the thermoplastic material extends at least from the first and second FTLs to the hard stop arrangement.

4. The assembly of claim 1, wherein the thermoplastic material is further provided between the hard stop arrangement and the first and second flow field plates, respectively.

5. The assembly of claim 1, wherein an adhesive is provided between the hard stop arrangement and the first and second flow field plates, respectively.

6. The assembly of claim 1, wherein the thermoplastic material provided between the first and second FTLs is diffused into the first and second FTLs.

7. The assembly of claim 1, wherein the thermoplastic material comprises a plurality of thermoplastic films.

8. The assembly of claim 1, wherein the thermoplastic material comprises:
   a first thermoplastic film provided between at least a portion of the first and second FTLs and extending within the gap; and
   a second thermoplastic film provided between at least the portion of the first and second FTLs and extending within the gap.

9. The assembly of claim 1, wherein the thermoplastic material comprises:
   a first thermoplastic film provided between at least a portion of the first and second FTLs, extending within the gap, and extending between the hard stop arrangement and the first flow field plate; and
   a second thermoplastic film provided between at least the portion of the first and second FTLs, extending within the gap, and extending between the hard stop arrangement and the second flow field plate.

10. The assembly of claim 1, wherein the hard stop arrangement comprises one or more incompressible stop members.

11. The assembly of claim 1, wherein:
   a portion of the membrane extends beyond the first and second FTLs; and
   the hard stop arrangement comprises:
      a first hard stop provided between a first surface of the membrane portion and the first flow field plate; and
      a second hard stop provided between a second surface of the membrane portion and the second flow field plate.

12. The assembly of claim 11, wherein the thermoplastic material is further provided between the first flow field plate and the first hard stop and between the second flow field plate and the second hard stop.

13. The assembly of claim 11, wherein the thermoplastic material comprises:
   a first thermoplastic film provided between at least the portion of the first and second FTLs, extending within the gap, and extending between the first hard stop arrangement and the first flow field plate; and
   a second thermoplastic film provided between at least the portion of the first and second FTLs, extending within the gap, and extending between the second hard stop arrangement and the second flow field plate.

14. The assembly of claim 11, further comprising:
a first adhesive layer provided between the first flow field and the first hard stop; and
a second adhesive layer provided between the second flow field and the second hard stop.

15. The assembly of claim 1, wherein the hard stop arrangement comprises one or more of polyethylene, polypropylene, polyester, fiberglass, nylon, PET, Delrin, Mylar, Kapton, Lexan or Teflon.

16. The assembly of claim 1, wherein the hard stop arrangement comprises PEN.

17. The assembly of claim 1, wherein the thermoplastic material comprises a polyester material.

18. The assembly of claim 1, wherein the thermoplastic material comprises a polyethylene or a fluoroplastic material.

19. The assembly of claim 1, wherein the thermoplastic material has a melting temperature range between about 50° C. and about 180° C.

20. The assembly of claim 1, wherein the thermoplastic material has a melting temperature about equal to a bonding temperature of the MEA.

21. The assembly of claim 1, wherein a plurality of the unitary fuel cell assemblies are arranged in an interconnected stack of the unitary fuel cell assemblies to define a fuel cell stack assembly.

22. The assembly of claim 21, wherein one or more of the fuel cell stack assemblies are incorporated into a fuel cell system.

23. A unitary fuel cell assembly, comprising:
a first flow field plate;
a second flow field plate;
a membrane electrode assembly (MEA) provided between the first and second flow field plates, the MEA comprising first and second fluid transport layers (FTLs) and a membrane provided between anode and cathode catalytic layers;
a hard stop arrangement provided between the first and second flow field plates, the hard stop arrangement dimensioned to control compressive forces imparted to the MEA upon establishment of contact between the first and second flow field plates under pressure; and
a sealing arrangement provided between the first and second flow field plates and peripheral to the MEA.

24. The assembly of claim 23, wherein the sealing arrangement is situated peripheral to the MEA and the hard stop arrangement.

25. The assembly of claim 23, wherein the sealing arrangement is situated between the MEA and the hard stop arrangement.

26. The assembly of claim 23, wherein the sealing arrangement at least partially encompasses the hard stop arrangement.

27. The assembly of claim 23, wherein the sealing arrangement comprises an elastomeric gasket.

28. The assembly of claim 23, wherein the sealing arrangement comprises an in-situ formed seal.

29. The assembly of claim 23, wherein the sealing arrangement is formed from a thermosetting material.

30. The assembly of claim 23, wherein the sealing arrangement comprises a silicone material.

31. The assembly of claim 23, wherein the sealing arrangement is formed from a curable, liquefied sealing material.

32. The assembly of claim 23, wherein the first and second flow field plates comprise trap channels for trapping excess sealing material.

33. The assembly of claim 23, wherein a portion of the membrane extends beyond the first and second FTLs, and the sealing arrangement contacts the membrane portion.

34. The assembly of claim 23, wherein the sealing arrangement contacts at least an peripheral edge of the MEA.

35. The assembly of claim 23, wherein the hard stop arrangement is separable with respect to the first and second flow field plates.

36. The assembly of claim 23, wherein the hard stop arrangement is integrally connected to one or both of the first and second flow field plates.

37. The assembly of claim 23, wherein the hard stop arrangement is provided between the MEA and a peripheral edge of the first and second flow field plates.

38. The assembly of claim 23, wherein the hard stop arrangement is provided along a peripheral edge of the first and second flow field plates, the stop arrangement separable with respect to the first and second flow field plates.

39. The assembly of claim 23, wherein the hard stop arrangement comprises:
a protruding surface of a peripheral edge of one of the first and second flow field plates;
a recessed surface of a peripheral edge of the other one of the first and second flow field plates; and
an electrically insulating material provided between the respective protruding and recessed surfaces.

40. The assembly of claim 23, wherein the hard stop arrangement comprises:
a channel provided on one of the first and second flow field plates;
an annular hard stop core; and
a curved recessed surface provided on the other one of the first and second flow field plates.

41. The assembly of claim 40, wherein the sealing arrangement comprises a curable liquefied sealant material, at least some of the liquefied sealant material provided in the channel and between the curved recess and an adjacent surface of the annular hard stop core.

42. The assembly of claim 23, wherein a plurality of the unitary fuel cell assemblies are arranged in an interconnected stack of the unitary fuel cell assemblies to define a fuel cell stack assembly.

43. The assembly of claim 42, wherein one or more of the fuel cell stack assemblies are incorporated into a fuel cell system.

44. A recyclable unitary fuel cell assembly, comprising:
a first flow field plate;
a second flow field plate;
a membrane electrode assembly (MEA) provided between the first and second flow field plates, the MEA comprising first and second fluid transport layers (FTLs) and a membrane provided between anode and cathode catalytic layers;
a sealing arrangement provided between the first and second flow field plates; and
an engagement arrangement releasably coupling together the first and second flow field plates, the engagement arrangement configured to permit repeated coupling and decoupling of the first and second flow field plates, whereby at least the first and second flow field plates are recoverable for reuse with a replacement component of the unitary fuel cell assembly.

45. The assembly of claim 44, wherein the engagement arrangement comprises one or more protruding surfaces provided on one of the first and second flow field plates; and one or more recessed surfaces provided on the other one of the first and second flow field plates.

46. The assembly of claim 44, wherein the engagement arrangement comprises a protruding surface of a peripheral edge of one of the first and second flow field plates; and a recessed surface of a peripheral edge of the other one of the first and second flow field plates.

47. The assembly of claim 44, wherein the engagement arrangement comprises a microstructured pattern provided on one or more surfaces of the first and second flow field plates.

48. The assembly of claim 44, wherein the engagement arrangement comprises a plurality of releasably engaging fasteners provided on one or both of the first and second flow field plates.

49. The assembly of claim 44, wherein the sealing arrangement is situated peripheral to the MEA.

50. The assembly of claim 44, wherein the sealing arrangement is separable with respect to the first and second flow field plates.

51. The assembly of claim 44, wherein the sealing arrangement comprises a pre-formed seal.

52. The assembly of claim 44, wherein the sealing arrangement comprises a curable, liquefied sealant.

53. The assembly of claim 44, wherein the sealing arrangement comprises a curable, liquefied silicone material.

54. assembly of claim 44, wherein the sealing arrangement comprises a thermoplastic material.

55. The assembly of claim 54, wherein the thermoplastic material comprises one or more thermoplastic films.

56. The assembly of claim 55, wherein the thermoplastic material comprises a polyester material.

57. The assembly of claim 55, wherein the thermoplastic material comprises a polyethylene or fluoroplastic material.

58. The assembly of claim 44, wherein the MEA is separable with respect to the first and second flow field plates.

59. The assembly of claim 44, wherein the MEA is a pre-bonded MEA.

60. The assembly of claim 44, further comprising a hard stop arrangement provided between the first and second flow field plates.

61. The assembly of claim 60, wherein the hard stop arrangement comprises one or more incompressible stop members.

62. The assembly of claim 60, wherein the hard stop arrangement comprises one or more of polyethylene, polypropylene, polyester, fiberglass, nylon, PET, Delrin, Lexan, Mylar, Kapton or Teflon.

63. The assembly of claim 60, wherein the hard stop arrangement comprises PEN.

64. The assembly of claim 44, further comprising a hard stop arrangement provided between the first and second flow field plates and separable with respect to the first and second flow field plates.

65. The assembly of claim 44, wherein a plurality of the unitary fuel cell assemblies are arranged in an interconnected stack of the unitary fuel cell assemblies to define a fuel cell stack assembly.

66. The assembly of claim 65, wherein one or more of the fuel cell stack assemblies are incorporated into a fuel cell system.

* * * * *

UNITED STATES PATENT AND TRADEMARK OFFICE
CERTIFICATE OF CORRECTION

PATENT NO. : 6,989,214 B2  Page 1 of 1
APPLICATION NO. : 10/295292
DATED : January 24, 2006
INVENTOR(S) : Shane S. Mao It is certified that error appears in the above-identified patent and that said Letters Patent is hereby corrected as shown below:

Column 4
Line 31: delete " (H) and electrons (e). "
and insert -- ($H^+$) and electrons ($e^-$). -- therefore.

Column 7
Line 25: delete " layer in an "
and insert -- layer in a -- therefore.

Column 10
Line 13: delete " cart " and insert -- can -- therefore.
Line 62: delete " of The " and insert -- of the -- therefore.
Line 65: delete " 9O " and insert -- 90 -- therefore.

Column 21
Claim 1, Line 63: delete " first field "
and insert -- first flow field -- therefore.

Column 24
Line 8: delete " least an " and insert -- least a -- therefore.

Column 25
Line 34: delete " assembly "
and insert -- The assembly -- therefore.

Signed and Sealed this

Thirty-first Day of July, 2007

JON W. DUDAS
*Director of the United States Patent and Trademark Office*